US009050909B2

(12) United States Patent
Röhnert et al.

(10) Patent No.: US 9,050,909 B2
(45) Date of Patent: Jun. 9, 2015

(54) MOTOR VEHICLE SEAT

(75) Inventors: Nick Röhnert, Chemnitz (DE);
Wolfgang Suck, Coburg (DE); Marco Gleißberg, Geringswalde (DE); Oliver Steffen, Coburg (DE); Guido Neumann, Lapzig (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 813 days.

(21) Appl. No.: 13/203,204

(22) PCT Filed: Feb. 24, 2010

(86) PCT No.: PCT/EP2010/052339
§ 371 (c)(1),
(2), (4) Date: Oct. 12, 2011

(87) PCT Pub. No.: WO2010/097408
PCT Pub. Date: Sep. 2, 2010

(65) Prior Publication Data
US 2012/0019037 A1 Jan. 26, 2012

(30) Foreign Application Priority Data

Feb. 24, 2009 (DE) .......................... 10 2009 010 226
Feb. 24, 2009 (DE) ..................... 20 2009 002 580 U
Feb. 24, 2009 (DE) ..................... 20 2009 002 581 U

(51) Int. Cl.
B60N 2/20 (2006.01)
B60N 2/08 (2006.01)
B60N 2/12 (2006.01)

(52) U.S. Cl.
CPC ............ B60N 2/0831 (2013.01); B60N 2/0818 (2013.01); B60N 2/123 (2013.01); B60N 2/20 (2013.01)

(58) Field of Classification Search
CPC .... B60N 2/0715; B60N 2/0818; B60N 2/123; B60N 2/3011
USPC ................................................ 297/340, 341
See application file for complete search history.

(56) References Cited

U.S. PATENT DOCUMENTS 4,844,542 A 7/1989 Humer
6,227,596 B1 5/2001 Foucault et al.
(Continued)

FOREIGN PATENT DOCUMENTS

DE 100 57 721 A1 5/2002
DE 101 27 153 A1 11/2002
(Continued)

OTHER PUBLICATIONS

English translation of International Preliminary Report on Patentability dated Aug. 30, 2011 for International Application No. PCT/EP2010/052339, 12 sheets.

Primary Examiner — Anthony D Barfield
(74) Attorney, Agent, or Firm — Christie, Parker & Hale, LLP

(57) ABSTRACT

The invention relates to a motor vehicle seat comprising a seat sub-frame adjustable along a rail longitudinal guide to which a backrest is hinged in a pivoting manner and can be folded forward toward a seating surface of the seat sub-frame, a locking device for arresting the rail longitudinal guide in an adjustable seating longitudinal position, an entry aid by means of which the locking device is released, when the backrest is folded forward to the seating surface and a memory arrangement for adjusting and restoring a memory position having a position memory that has an adjustment means for adjusting the memory position in the rail longitudinal direction of the rail longitudinal guide and a locking element that is connected to the adjustment means in a pivoting manner that under the effect of a control element can be pivoted in a locking rail for locking the adjusted memory position and pivoted out of the locking rail for adjusting a memory position and is connected to the adjustment means via a slotted guide such that a virtual point of rotation of the locking element lies underneath the rail profile of the locking rail.

5 Claims, 19 Drawing Sheets

(56) References Cited

U.S. PATENT DOCUMENTS

| | | |
|---|---|---|
| 6,631,952 B1 | 10/2003 | Liebetrau et al. |
| 7,097,250 B2 | 8/2006 | Rausch et al. |
| 7,578,555 B2 | 8/2009 | Hofmann et al. |
| 7,926,875 B2 * | 4/2011 | Schmale .............. 297/344.11 X |
| 2004/0026975 A1 | 2/2004 | Rausch et al. |
| 2007/0236065 A1 | 10/2007 | Hofmann et al. |

FOREIGN PATENT DOCUMENTS

| | | |
|---|---|---|
| DE | 203 18 787 U1 | 4/2005 |
| DE | 10 2004 015450 A1 | 11/2005 |
| DE | 20 2004 011 388 U1 | 12/2005 |
| DE | 10 2004 039370 A1 | 2/2006 |
| DE | 10 2006 009 265 A1 | 8/2006 |
| DE | 10 2005 020696 A1 | 11/2006 |
| EP | 0 945 301 A1 | 9/1999 |
| FR | 2 882 539 A1 | 9/2006 |
| WO | WO 00/55002 A2 | 9/2000 |

* cited by examiner

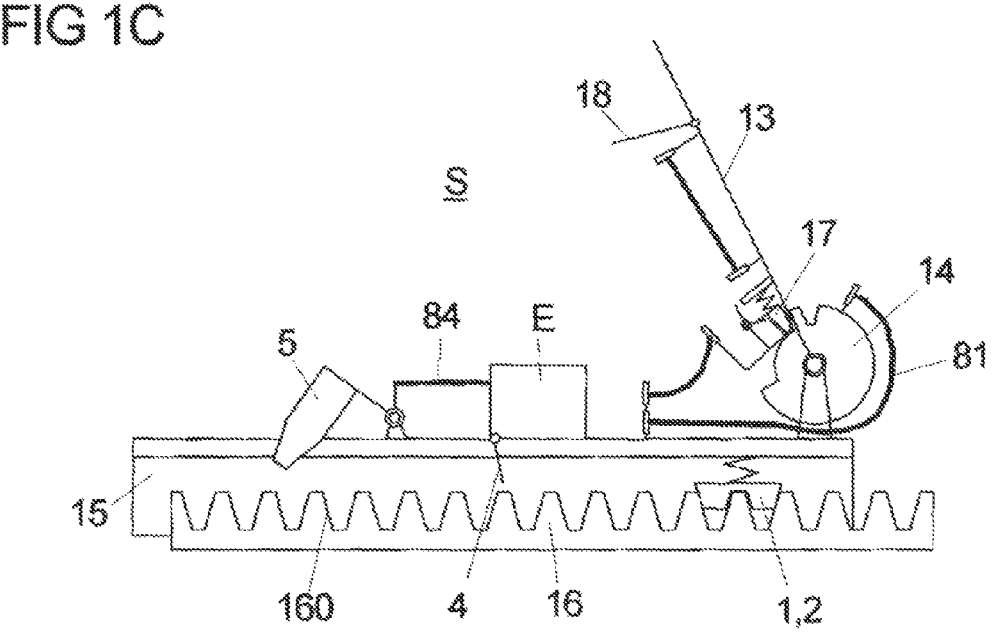
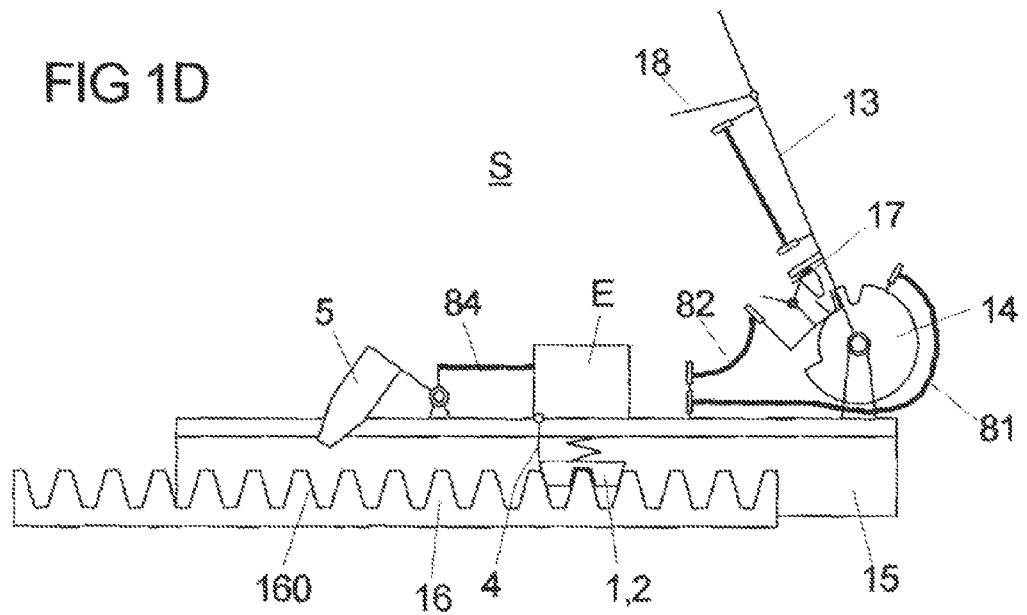

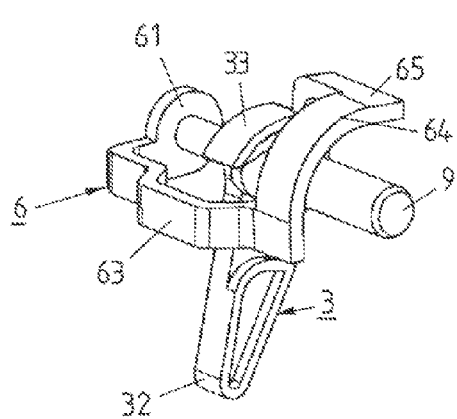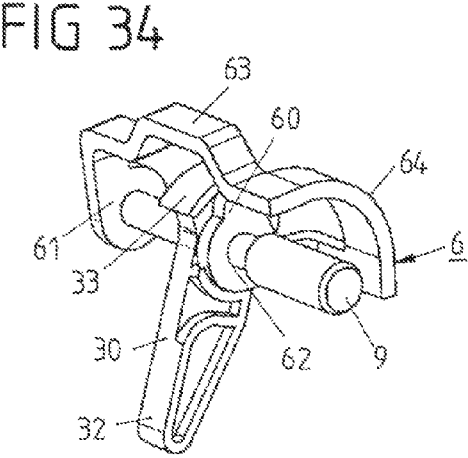

MOTOR VEHICLE SEAT

CROSS-REFERENCE TO A RELATED APPLICATION

This application is a National Phase Patent Application of International Patent Application Number PCT/EP2010/052339, filed on Feb. 24, 2010, which claims priority of German Patent Application Number 10 2009 010 226.4, filed on Feb. 24, 2009, of German Utility Model Application Number 20 2009 002 580.2, filed on Feb. 24, 2009 and of German Utility Model Application Number 20 2009 002 581.0, filed on Feb. 24, 2009.

BACKGROUND

The invention relates to a motor vehicle seat.

A motor vehicle seat is known from WO 00/5002 A1, which has a seat frame and a backrest pivoted to the seat frame, which can be folded, when using the motor vehicle seat as a front seat in in particular two-door motor vehicles, in direction to a seating surface of the seat frame out of its essentially upright use position. The seat frame is movable for adjusting the seating longitudinal position along a rail longitudinal guide and can be locked by the means of a locking device with at least one movably mounted locking element in a previously adjusted seating longitudinal position on a locking rail, which has multiple locking positions being arranged in rail longitudinal direction one after the other, in which the locking element engages for locking the rail longitudinal guide.

The rail longitudinal guide comprises a guide rail (lower rail) to be arranged tightly to the vehicle or vehicle body as well as a guide rail (upper rail) carrying the seat frame on the side of the seat, which engage with each other such that the seat sided guide rail can be displaced along the extension direction of the rail longitudinal guide, that means in rail longitudinal direction, on the guide rail being arranged fixed to the body in order to dislocate the seat frame in rail longitudinal direction, thus to newly adjust the seating longitudinal position.

The locking rail of the rail longitudinal guide having multiple locking positions being arranged in rail longitudinal direction one after the other, wherein in said locking rail the locking element can engage for locking the rail longitudinal guide in a specific seating longitudinal position, is usually combined with the lower rail of the rail longitudinal guide to be arranged fixed to the body to a unit, in particular the locking rail can be integrated in one piece into the lower rail to be arranged fixed to the body, such that the locking positions thereof can be formed itself as lower rail hole pattern immediately in the guide rail to be arranged fixed to the body.

In order to facilitate the entry of a passenger into the rear of a motor vehicle and to provide the maximum space for the entry into the rearmost seating row, an entry aid or so called "easy-entry-function" is provided, with which the locking of the rail longitudinal guide is cancelled after folding forward the backrest in direction to the seating surface and through this the seat frame and thus the complete motor vehicle seat can be moved forward so that the maximal space for the entry into the rear or to the rearmost sitting row of the motor vehicle is guaranteed. In order to bring the motor vehicle seat subsequently again simply in its original seating longitudinal position, the original seating longitudinal position is stored as memory position by the means of a mark or memory arrangement provided therefore, so that the seat frame is automatically stopped in the memory position when moving back, wherein a stop assigned to the memory arrangement interacts with a counter stop assigned to the seat frame.

A position memory is provided for storing the memory position, wherein said position memory has an adjustment means for adjusting the memory position in rail longitudinal direction of the rail longitudinal guide and a locking element pivotably connected to the adjustment means for anchoring the memory arrangement in a specific seating longitudinal position, which engages into a separate latching rail aligned parallel to the locking rail of the seating longitudinal adjustment or into the locking rail or the lower rail hole pattern itself.

A control element is provided for controlling the engaging and disengaging of the locking element into or out of the latching or locking rail, wherein said control element guarantees that the locking element engages into the locking rail and the memory arrangement locks, when the backrest is folded forward for performing the memory function. For this the locking element is elastically preloaded in direction to an engagement with the locking rail. If the seat is in the memory position with a backrest arranged in the use position, thus essentially upright, then the control element affects the locking element such that it is lifted out of the locking rail. Additionally, it can be provided that when newly adjusting the seating longitudinal position of the motor vehicle seat with a backrest being in use position, simultaneously a new memory position is adjusted according to the newly adjusted seating longitudinal position of the motor vehicle seat.

When folding the backrest forward for exerting the easy-entry-function the control element releases on the other hand the locking element so that said element only engages with the locking rail under the action of the elastic preload and the current seating longitudinal position of the motor vehicle seat is stored as memory position. For this reason the control element is connected via a coupling mechanism, for instance via a Bowden cable to the backrest.

The control element is formed for instance as a control lever, which is preloaded elastically into a direction of a position in which said lever affects the locking element such that said locking element is lifted out of the locking rail. When folding forward the backrest against said preload the control lever is transferred in a position in which the control lever releases the locking element.

Furthermore, a locking mechanism can be assigned to the backrest, with which the backrest can be locked in its position folded forward to the seating surface so that said backrest remains permanently in the forward folded position when exerting the memory function. A release element being movable together with the seat frame and for instance mounted on the seat sided rail is assigned to this locking mechanism, wherein said releasing element is actuated when starting the memory position and is coupled to the unlocking mechanism of the backrest, for instance via a Bowden cable such that it unlocks the locking mechanism when starting the memory position. For this, a switch area, for instance in form of a ramp is provided for example on the memory arrangement, with which the release element being preferably formed as a pivotably mounted release lever interacts when approaching the memory position, wherein the release element is actuated such that it unlocks the backrest being folded forward.

The control element, which effects when folding forward the backrest the locking of the memory arrangement, as well as the release element, which effects the unlocking of the folded backrest when starting the memory position after exerting the easy-entry-function, are preferably pivotable mounted on the same bearing shaft. This bearing shaft is displaceably arranged together with the seat frame in rail longitudinal direction, that means in particular on the seat sided upper rail of the rail longitudinal direction.

Since the forces exerted, when the seat frame sided counter stop strikes the stop provided on the locking element of the memory arrangement, can be introduced via the control element directly into the very stable locking rail, the sliders, on which the control element is pivotable mounted, as well as the sliding rail provided for guiding the slider can be made cost efficiently of plastics.

The control element with which the engaging and disengaging of the locking element of the memory arrangement with the locking rail can be controlled, can furthermore serve to act, when the backrest is in use position and accordingly not locked memory arrangement, as a carrier onto the adjustment means of the memory arrangement being formed as a slider such that when adjusting the motor vehicle seat with a backrest being in the use position the memory position is automatically newly adjusted via the adjustment means according to the displacement of the motor vehicle seat. For this reason the control element engages in case of an upright backrest with the locking element of the memory arrangement and/or with the slider serving as adjustment means of the memory arrangement in a form-fitted manner.

If the memory position is once started after exerting the easy-entry-function with an upright backrest, for instance in case of a vehicle seat which can not be locked in its folded forward position, then the control element slides over a control face of the locking element of the memory arrangement, wherein said locking element is lifted out of the locking rail and engages furthermore form-fitted with the locking element or the assigned slider of the memory arrangement, so that in case of a further movement of the motor vehicle seat with a backrest being in use position the memory position can newly be adjusted. The memory position represents thus always the seating longitudinal position being started at last with the backrest being in use position.

The memory arrangement consisting of the adjustment means in form of a slider, the locking element and a control element in form of a control lever as well as optionally a comfort or release lever is realized in different manners.

In a first embodiment the memory arrangement comprises a gear rack kinematics, wherein the adjustment means in form of the slider is formed as a gear rack and the locking element is formed as a gear. The disadvantage of this embodiment are the high manufacturing costs and the tolerance tuning of the tooth contour of the gear rack kinematics for self-blocking the whole system, wherein the memory arrangement is guided in a plastic guide rail.

In an alternative embodiment the locking element is pivotably mounted vertical to the rail longitudinal direction of a latching rail, wherein the centre of rotation for mounting the locking element is arranged above the rail profile of the latching rail. The adjustment means in form of the slider is guided in a guide rail so that the arrangement of two rails, namely a latching rail and a guide rail is required, what causes considerable manufacturing costs and an increased weight as well as an impact onto the functional weight of the lower rail profile of the guide rails of the motor vehicle seat.

Due to the application of latching rails for adjusting the memory position the centre of rotation of the locking element can be arranged above the rail profile, wherein the rotation of the locking element is realized via a bearing shaft above the rail profile. Due to the centre of rotation of the locking element being arranged above the rail profile the latching behaviour of the locking element is however not optimal, when adjusting a memory position and can lead to a lifting of the locking element out of the latching position and thus to an undesired adjustment of the adjusted seating position when starting the memory position when moving back the motor vehicle seat.

It is known from the DE 100 57 721 A1 to use a carrier acting on the locking element as control element, wherein said carrier is arranged longitudinally displaceable on the seat rail and comprises a longitudinally extending base body on which, on the lower end thereof facing the locking element a carrier element provided with a carrier opening is formed. The carrier is preloaded by the means of a pressure spring, which is supported on the one hand by the seat rail and on the other hand by the carrier element, in direction to the locking element such that said carrier has the tendency to lift a latching hook of the pawl out of the latching rail, wherein simultaneously a projection of the locking element formed as a latching nose engages with the carrier opening of the carrier. The carrier is controlled by a switching means that when folding forward the backrest towards the seating surface lifts the carrier from the locking element. In order to sufficiently exact guide the carrier formed as a control pin a bore hole is required in the upper or lower rail or in the locking device with which the rail longitudinal guide is blocked.

The control element, which effects the locking of the memory arrangement when folding forward the backrest, as well as the read-out element, which effects the unlocking of the backrest being folded forward when starting the memory position after exerting the entry aid function, can be alternatively formed as pivot levers and can be pivotably mounted on the same bearing shaft. This bearing shaft is displaceably arranged together with the seat frame in rail longitudinal direction, in particular on the seat sided upper rail of the rail longitudinal guide.

Such a control element formed as a pivot lever is known from the DE 10 2005 020 696 A1. The pivot movement of the pivot lever, which is required for actuating the locking element, requires however a larger groove in the upper or seat rail, through which the stability and crash safety of the upper rail is impaired.

Since the entry aid and memory arrangement is controlled or released from the hinge fitting connecting the seat sub-frame pivotably with the backrest when folding forward the backrest towards the seating surface of the seat sub-frame, the function of the entry aid and memory arrangement depends essentially on the geometry of the hinge fitting. Since the hinge fittings of the different seat manufacturers are formed and dimensioned differently, an individual adaptation of the entry aid and memory arrangement to the respective hinge fittings has to be carried out and/or a sufficient empty run and overrun in the control chain from the hinge fitting to the locking device of the rail longitudinal adjustment and position memory of the memory arrangement has to be provided. Accordingly, it is necessary to provide different entry aid and memory arrangements for the respective hinge fittings or an expensive adaptation of the entry aid and memory arrangement to the respective hinge fitting of the different motor vehicle seats is necessary and optionally a reduced functionality of the entry aid and memory arrangement has to be accepted.

SUMMARY

The object of the present invention is to provide a motor vehicle seat of the previously mentioned kind with an entry aid and memory arrangement, in which the entry aid and the memory arrangement guarantee a secure latching of the locking element of the memory arrangement in an adjusted memory position by having lower manufacturing and assembling cost as well as a lower weight of the guide rails for the longitudinal adjustment of the motor vehicle seat.

The solution according to the invention provides an entry aid and memory arrangement for a motor vehicle seat, which guarantee a secure latching of the locking element in an adjusted memory position by having lower manufacturing and assembling costs as well as a lower weight of the guide rails for the longitudinal adjustment of the motor vehicle seat.

According to an exemplary embodiment of the invention the latching behaviour of the locking element is optimized by the displacement of the (virtual) rotational point of the locking element in an area below the rail profile and by integrating the locking element into the adjustment means formed as a slider the arrangement of a combined latching and guide rail is possible so that the manufacturing and assembly costs are minimized and the weight of the memory arrangement is reduced without having an impact on the functional mass of the lower rail profile of the guide rails for the longitudinal adjustment of the motor vehicle seat. The cost reduction is thereby due to the very simple assembly and the lower number of singular components of the memory arrangement. The simple kinematics during the pivot movement of the locking element guarantees furthermore a secure function and durability of the memory arrangement.

Due to the pivot direction of the locking element and the latching direction into the lower rail hole pattern the latching rail welded to the lower rail is cancelled and a simple, light plastic guide rail obtainable at low manufacturing costs can be used as sliding rail for the position memory.

The connection of the locking element of the position memory via a slotted guide to the adjustment means allows the production of a low cost, tolerance insensitive system which is not under the danger that the position memory pivots by the action of external forces out of the latching with the lower rail hole pattern of the locking rail and thus the saved position is being lost. Furthermore, the position memory can be integrated without problems into the existing upper rail profile without that the seat structure stiffness is weakened or extensive deformations of the upper rail occur in case of a crash due to the kinematics of the entry aid.

The slotted guide is exemplary composed of at least two slotted guide sections, wherein the virtual centre of rotation of the locking element is determined by the intersection of the normals of the slotted guide sections.

The slotted guide consists in particular of at least two path curves arranged in the locking element and guiding elements of the adjustment means assigned to the path curves, which are preferably formed as guide bolts, which engage in the path curves of the locking element and have latch noses at their ends, through which the assembly of the memory arrangement is considerably simplified.

Instead of two guide bolts engaging into the path curves of the slotted guide, a guide contour can be provided in the slider, what further reduces the manufacturing and assembly costs, since the slider is made by plastic injection moulding and the guide contour can be included into the injection mould.

In an exemplary embodiment the bottom side of the locking element of the position memory has an engagement area, which engages in at least one locking position of the locking rail for adjusting a memory position, while a control face extends on its upper side via which the locking element interacts with the control element such that the control element engages either with its engagement area into the locking position of the locking rail and locks the memory arrangement in a specific seating longitudinal position or lifts out of the locking rail for displacing the memory arrangement for a new adjustment of the memory position in rail longitudinal direction, wherein the control element is preloaded in direction to the locked state and has on at least one side surface the guide paths of the slotted guide interacting with the guide elements of the adjustment means.

In order to optimize the dimensional accuracy and durability the locking element is made of a sintered material, what allows the integration of a locking ramp into the locking element without tolerance problems so that the comfort or release lever can continue on a path curve of the locking element and the locking element can press simultaneously into the lower rail hole pattern of the locking rail.

Besides a simplification of the manufacturing process no expensive treatment is required in contrast to a position memory designed as a steel stamping in order to fulfil the requirements of a position memory.

The manufacturing of the position or locking element out of a sintered material allows furthermore for integrating the locking ramp into the locking element so that the comfort lever can continue along a path curve of the locking element and can press it simultaneously into the locking rail.

The locking element made of sintered material allows in a further exemplary embodiment for adapting the engagement area of the locking element to the contour of the locking positions of the locking rail by designing the engagement area with radii, which are adapted to the radii of the lower rail hole pattern of the locking rail such that the engagement area uses the complete hole width of the locking rail for abutment and thus for support. Through this, the surface pressure and as a consequence the deformations at the locking element and the lower rail hole pattern of the locking rail is minimized.

According to a further exemplary embodiment a device for controlling the motion sequence of the components of an entry aid with memory arrangement for a motor vehicle seat is provided, which is connected to a reduced manufacturing and assembly cost, which requires only a small groove in the upper rail of the rail longitudinal guide, which does not essentially influence the stability of the upper rail and thus the rail longitudinal guide and thus increases the crash safety of the motor vehicle seat.

By having this solution according to the invention the rotational movement of the rocker being operatively connected to the actuating device for the entry aid function and being pivotable about the bearing shaft is transferred into a translational movement of the control lever so that for controlling the locking element when anchoring and releasing the position memory only an insignificant groove in the upper rail of the rail longitudinal guide is required, which is essentially being adapted to the cross sectional form of the control lever.

A simple assembly is guaranteed due to the mounting of the control element on the bearing shaft, since the components of the control element are simply to be attached to the bearing shaft. Simultaneously, an exact adjustment of the motion sequence when anchoring the position memory in the locking rail and unlocking the locking device when releasing the entry aid function is guaranteed due to the pivot movement of the rocker for translational lifting and lowering the control lever.

The control lever is exemplary movable vertically or in an obtuse angle to the longitudinal extension of the control face of the locking element and guarantees therefore that the locking element being resilient in engagement direction in the locking rail opposite to the slider of the position memory can be securely controlled so that a secure anchoring of the position memory in a memory position as well as its release by a complete lifting out of the anchoring for longitudinal adjustment of the position memory for adjusting a new memory position is guaranteed.

The translational adjustment of the control lever for actuating the position memory is preferably effected by a lever or cam shaft arrangement arranged between the control lever and the rocker, wherein said arrangement has a minor space requirement and is producible in particular as a plastic injection mould component at low costs in contrast to a conventionally applied spring transmission.

The control lever has an elongated hole for mounting to the bearing shaft, wherein said elongated hole is attached to the bearing shaft so that no separate guidance of the control lever in the upper rail or in the locking device is required for the rail longitudinal guidance.

The lever or cam shaft arrangement of the control element converting the rotational movement of the rocker into a translational movement of the control lever consists preferably of a control curve of the control lever and a control cam of the rocker sliding on the control curve so that when pivoting the rocker the control cam acting on the control curve of the control lever moves the control lever translationally, that means in direction of the longitudinal extension of the elongated hole in respect to the control face of the locking element due to the connection of the control lever to the bearing shaft via an elongated hole.

In order to release the entry aid function the rocker is connected via a release Bowden cable to the entry aid lever being arranged due to ergonomical reasons in the area of the upper edge of the backrest, wherein the release Bowden cable is preferably inserted into a cable support of a pulley formed as a part of the control element or into a pulley, which is attached to the bearing shaft and coupled to the rocker.

Due to the arrangement of the pulley for receiving the release Bowden cable on the one hand an exact guidance of the release Bowden cable is guaranteed and on the other hand an adaptation to different kinematics of entry aid constructions with memory function for different motor vehicle seats is possible since due to the configuration or geometry of the pulley the longitudinal movement of the release Bowden cable can be converted into a constant pivot movement of the rocker.

For this purpose the cable support of the pulley for the release Bowden cable is formed continuing excentrically to the bearing shaft so that by determining and adjusting the geometry and arrangement of the cable support, the pulley, the rocker, an unlocking lever of the locking device for unlocking the rail longitudinal guidance for adjusting the motor vehicle seat and an actuating lever actuating the unlocking lever and being operatively connected to the rocker the rotational and translational functional elements of the control element can be synchronized with each other such that the position memory is anchored in the locking rail before the rail longitudinal guide is released for adjusting the motor vehicle seat. Through this, a secure anchoring of the position memory in the locking rail and thus a secure adjustment of the memory position is guaranteed.

In order to optimize the handling comfort when using an entry aid the backrest can be locked in its position folded forward to the seating surface of the seat sub-frame by the means of a locking mechanism, which can be again unlocked by the means of a comfort lever, which is actuated when starting the memory position and is coupled to the locking mechanism of the backrest via a release Bowden cable.

In order to simplify the assembly the comfort lever is also pivotably mounted on the bearing shaft receiving the control element, wherein said bearing shaft is supported by a fixing bracket being displaceable together with the seat frame in rail longitudinal direction, and has a first lever end, which when starting the memory position runs up to a locking ramp of the locking element of the position memory, through which the comfort lever is actuated for unlocking the locking mechanism.

In an exemplary embodiment the comfort lever is formed U-shaped and has a first arm connected to the release Bowden cable, a second arm, the lever end thereof interacts with the locking ramp of the position memory and a connecting arm. The first or second arm of the U-shaped comfort lever is passed through a groove being arranged on the upper edge of the upper rail.

When applying a U-shaped comfort lever, the control of the comfort function for unlocking the backrest being folded forward can be displaced when starting the memory position after exerting the entry aid function from the inner space of the rail longitudinal guide outwards without that a lateral recess into the upper rail is required for this purpose. Due to the omission of the lateral groove in the upper rail the stability of the upper rail and the crash safety of the rail longitudinal guide are not impaired.

A further exemplary embodiment of the invention provide an entry aid and memory arrangement which can be used with optimal functionality for different motor vehicle seats or for the application of different hinge fittings by low manufacturing and assembly costs.

This solution according to the invention allows the application and the use of an entry aid and memory arrangement for different hinge fittings or motor vehicle seats of different manufacturers, which is optimally designed in respect to its functionality, without that an adaptation of the control chain from the actuating lever to the entry aid and memory arrangement for instance by the use of adjustable Bowden cables for compensating tolerances has to be carried out or a sufficient empty run and overrun has to be introduced into the system in order to consider the different cable paths of the different backrest fittings.

Since the kinematics of the entry aid function does not have to be touched when using the adapter according to the invention, the manufacturing costs can be minimized by providing an entry aid and memory arrangement, the assembly can be simplified and thus the assembly cost can be reduced. Due to the use of different adapters the functionality when controlling the entry aid and memory arrangement for the different hinge fittings or motor vehicle seats can be simultaneously improved by conducting the unlocking of the locking device and control of the position memory of the memory arrangement in a very precise manner.

The adapter is exemplary connected via a connecting element, in particular via a flexible pulling means connected to the hinge fitting, which is translational displaceable when pivoting the backrest, to the entry aid lever or to a hinge fitting being controllable by the means of the entry aid lever for pivotably hinging the backrest to the seat sub-frame and converts the translational movement of the connecting element into a rotational movement, with which the locking element of the position memory can be pivoted in the locking rail for locking the adjusted memory position and with which the locking element can be pivoted out of the locking rail for adjusting a memory position.

The cable core of an actuating Bowden cable can be provided as a flexible pulling means, the Bowden support thereof is connected to a fixing bracket receiving the memory arrangement.

Due to the formation of a guide contour being separated from a rotational axis of the adapter, wherein the flexible pulling means can be wined up and can be unwind from said control contour, the proportion of the rotation of the adapter can be precisely adjusted in dependency on the translational displacement of the flexible pulling means so that a likewise precise control of the position memory can occur in relation to the control of the locking device.

In an exemplary embodiment a pulley is used as an adapter, wherein the bearing shaft of said pulley is concentrically arranged to the pivot axis of the control element and wherein the control contour of said pulley receiving the flexible pulling means is formed as a peripheral control face and continues arc-shaped about the bearing shaft.

Due to the arrangement of a cable support, in particular a pulley for receiving and guiding the flexible pulling means in the peripheral control face of the pulley an optimal cable guidance is guaranteed.

Due to the arrangement of latching means on the pulley, preferably in form of clips arranged on a side surface of the pulley, the pulley can be mounted in a simple manner on the control element, whereby a simple assembly of the adapter on the control element is guaranteed and an adaptation to different hinge fittings or motor vehicle seats can be guaranteed without additional manufacturing costs.

Due to the arrangement of an additional control face on the pulley for controlling a remote unlocking the complete function of the controlling the entry aid and memory arrangement is simplified and the number of components for controlling the different entry aid and memory functions is reduced.

The pulley consists exemplary of plastic so that a simple manufacturing of different pulleys for different hinge fittings for the use of an entry aid and memory arrangement is possible.

The adapter can consists alternatively of a lever arrangement, which is on the one hand connected to the control element and on the other hand to the flexible pulling means and the lever arms thereof are dimensioned such that depending on the geometry of the hinge fitting the control element controls the position memory of the memory arrangement for anchoring the position memory in the locking rail before the locking device of the rail longitudinal guide for displacing the motor vehicle seat in the entry aid function is released.

BRIEF DESCRIPTION OF THE DRAWINGS

The idea on which the invention is based shall be explained in detail by the means of the embodiments illustrated in the drawings.

FIG. 1a to 1e show schematic illustrations of a seat frame of a motor vehicle seat for explaining the function of the entry aid and the memory arrangement according to the invention.

FIGS. 14 to 18 show schematic illustrations of the motion sequences of the components of the memory arrangement for displacing and locking the memory arrangement, wherein FIGS. 14 and 15 show the memory arrangement is shown in a carrier position, FIGS. 16 and 17 show the memory arrangement is shown when removing the locking element and FIG. 18 shows the memory arrangement is shown in the locking position of the locking element.

FIG. 33 shows an isometric view of a control lever of the control element according to the invention.

FIG. 34 shows a side view of a control lever of the control element according to the invention.

DETAILED DESCRIPTION

Figure 1A:
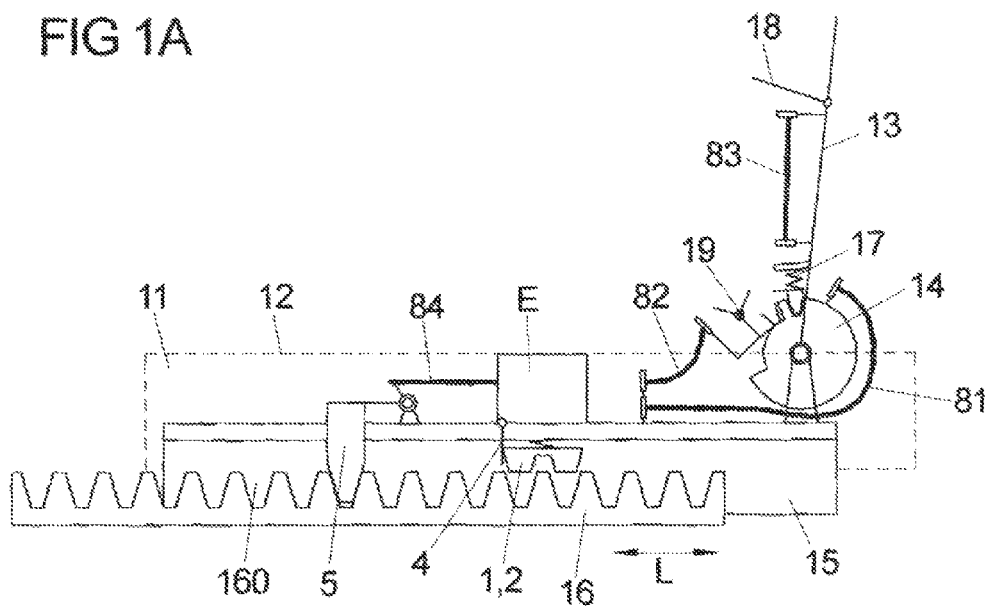

In FIGS. 1a to 1e a seating system S of a motor vehicle seat provided with an entry aid and a memory arrangement is illustrated schematically in different motion sequences of the entry aid and memory arrangement. The seating system schematically illustrated in a side view comprises a seat sub-frame 11 displayed with dotted lines, to which a backrest 13 is pivotably hinged via a hinge fitting 14. The seat sub-frame 11 is connected to a seat sided guide rail 15 (upper rail), which is mounted in rail longitudinal direction L longitudinally displaceable on a guide rail 16 (lower rail) fixed to the vehicle body. The seat sub-frame 11 comprises a seating support or a seating surface 12 for receiving a seat cushion on which a vehicle occupant can take a seat.

The upper rail 15 longitudinally displaceable in rail longitudinal direction L and movable on the lower rail 16 is connected to a locking device 5, which can lock the upper rail 15 in different positions at the lower rail 16 provided with a latching profile in form of a toothing, a lower rail hole pattern 160 or such for adjusting a seating position being optimal for the vehicle occupant.

When such motor vehicle seat being displaceable in rail longitudinal direction L is used for a two-door motor vehicle, then an entry aid (easy-entry-component) E is provided for elevating the entry into the rear compartment of the motor vehicle, with which the backrest 13 is coupled to the seating longitudinal adjustment such that when folding forward the backrest 13 in direction to the seating surface 12 of the seat sub-frame 11, the locking device 5 assigned to the rail longitudinal guide 15, 16 can be unlocked and the motor vehicle seat can be displaced forward with forward folded backrest 13.

If the motor vehicle seat shall again be pushed back after folding forward the backrest 13 towards the seating surface 12 and the subsequent displacement into a displaced position elevating the entry into its starting position before performing the entry aid function, then a memory arrangement with a position memory 1, 2 elevates the retrieving of the original seating position by storing the current seating longitudinal position of the seat sub-frame 11 by the means of the position memory 1, 2 when folding forward the backrest 13 towards the seating surface 12 of the seat sub-frame 11 and by again arresting the motor vehicle seat when moving back out of the displaced position automatically in the seating longitudinal position stored as memory position, wherein a counter stop of a component group being displaceable together with the seat sub-frame 11 strikes a stop of the position memory 1, 2 anchored in the lower rail hole pattern 160.

FIG. 1*a* shows the starting position of a motor vehicle seat before actuating the entry aid E and memory arrangement with the position memory 1, 2, in which the backrest 13 is in an essential upright position and the locking device 5 fixates the longitudinal adjustment of the rail longitudinal guide 15, 16. When actuating an entry aid lever 18 at the backrest 13 the latching of the backrest 13 is released by the means of a latching member 17 interacting with the hinge fitting 14 for backrest folding via a Bowden cable 83 and the entry aid E is released. By releasing the latching of the backrest 13 the pivoting of the backrest 13 about the rotational axis in the hinge fitting 14 in direction to the seating surface 12 of the seat sub-frame 11 is possible, wherein due to this movement an actuating Bowden cable 81 is pulled and the entry aid E is controlled.

Figure 1B:
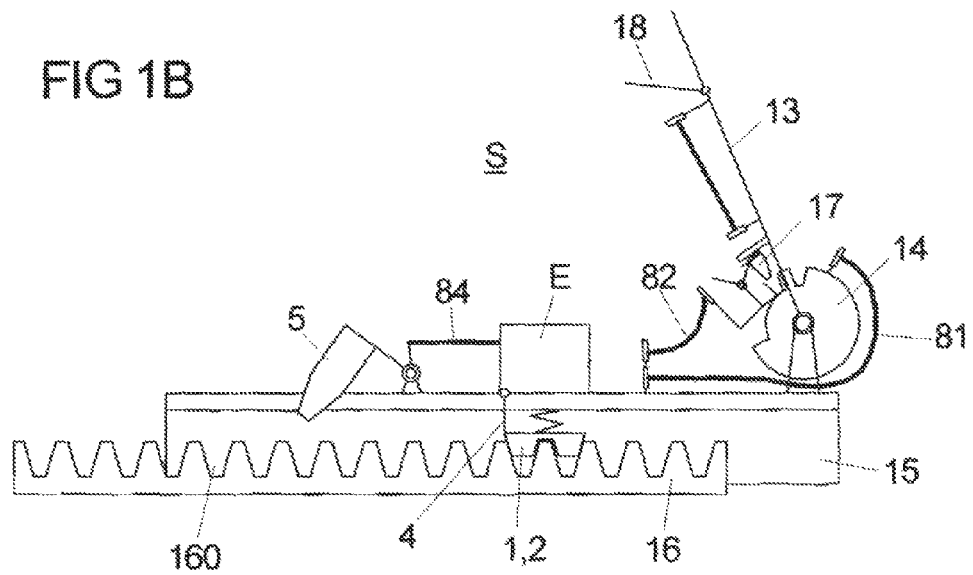

The kinematic of the entry aid E controls via an unlocking Bowden cable 84 according to FIG. 1*b* the locking device 5 and unlocks the locking of the rail longitudinal guide 15, 16 in order to be able to release this when folding forward the backrest 13 towards the seating surface 12 of the seat sub-frame 11 so that the rail longitudinal guide 15, 16 can be moved towards each other for displacing the seat sub-frame forward after the position memory 1, 2 of the memory arrangement was released.

Figure 10:
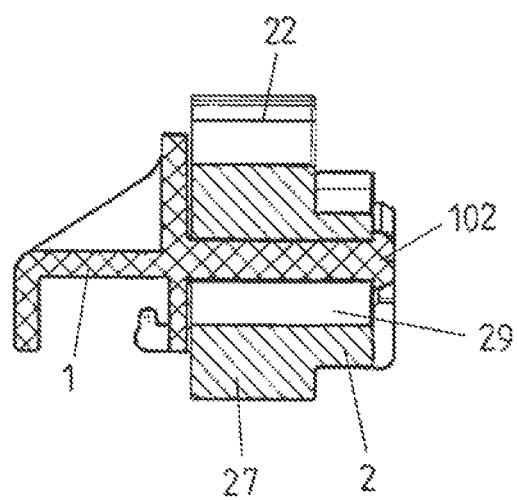
FIG. 10 shows a longitudinal section through the position memory along the intersecting line X-X according to FIG. 9.

If the motor vehicle seat is moved forward out of the position illustrated in FIG. 1*b* then the position memory 1, 2 remains in the lower rail 16 at the previously adjusted memory position. In case of a system with comfort function, a comfort or release lever 4 according to FIG. 10 being operatively connected to the position memory 1, 2 is pivoted and latches the backrest 13 in the folded forward position via a release Bowden cable 82 and a lever 19.

As illustrated in FIG. 1*d* the comfort lever 4 strikes the position memory 1, 2 when moving back. The release Bowden cable 82 is pulled up via the entry aid E and pivots the lever 19, which releases the locking 17 of the backrest 13 in the hinge fitting 14 so that the backrest 13 can be folded back without actuating the entry aid lever 18.

Figure 1E:
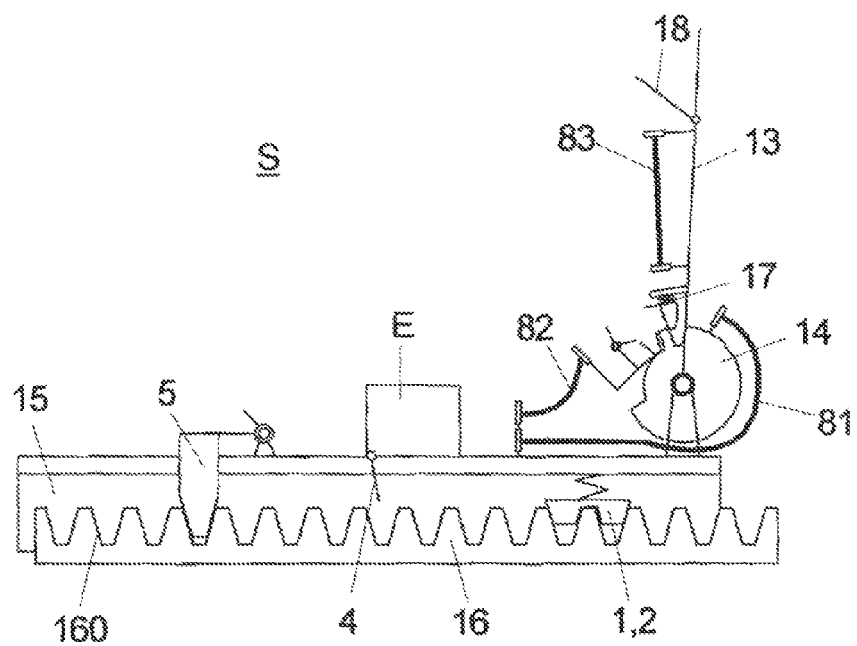
Figure 2:
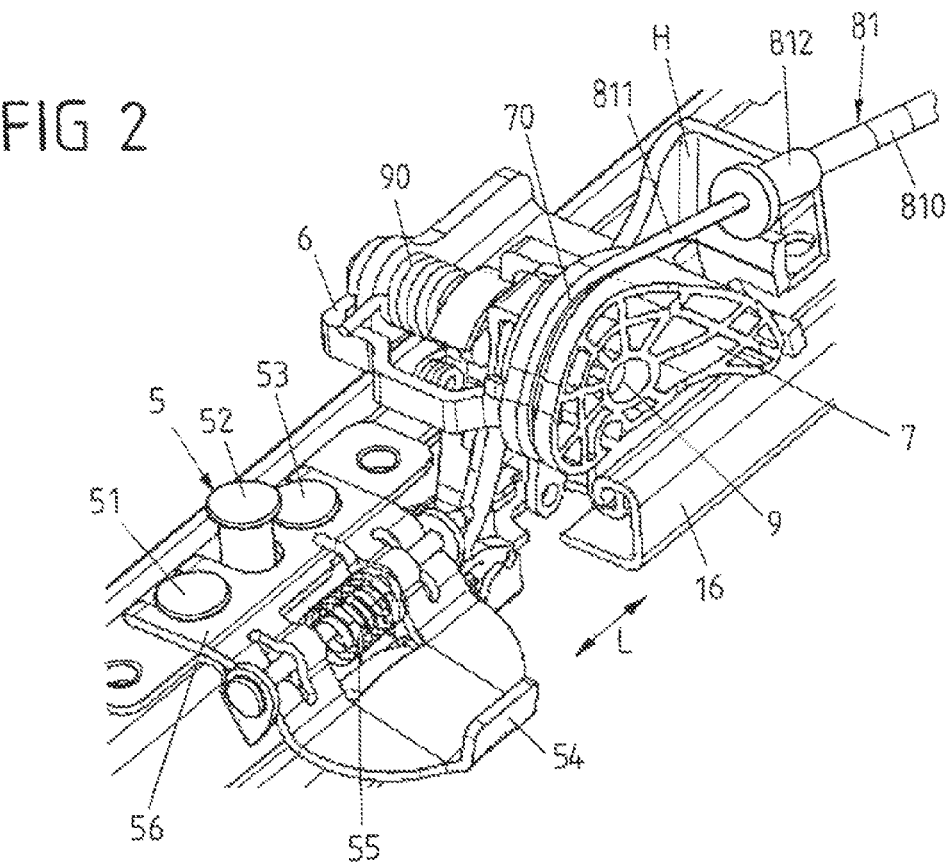
FIG. 2 shows a perspective illustration of the locking device and memory arrangement for a motor vehicle seat.
Figure 3:
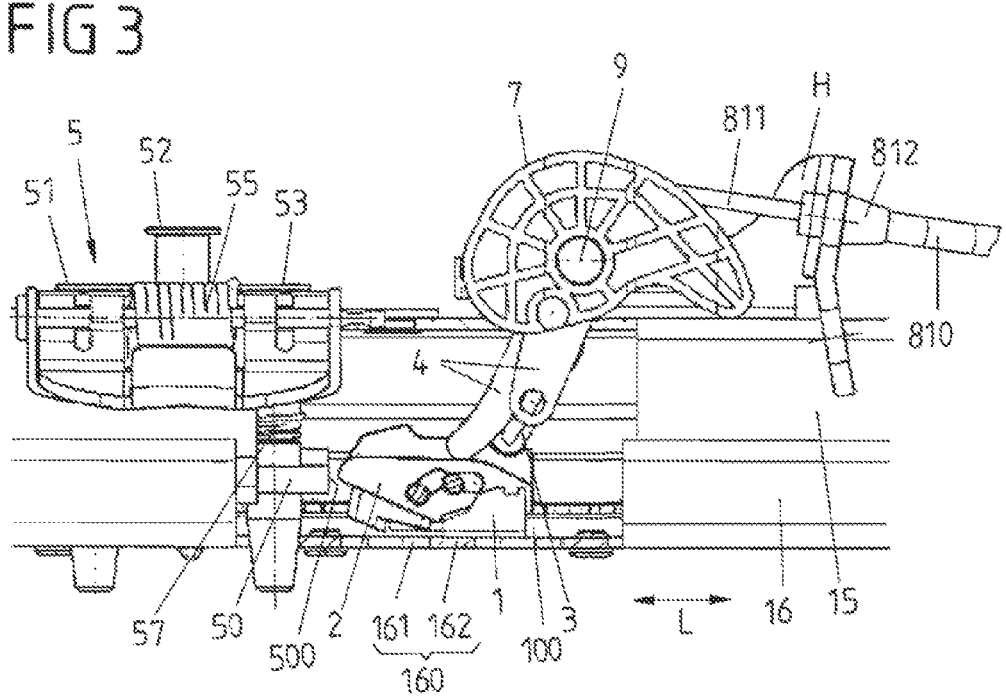
FIG. 3 shows a side view of the locking device and memory arrangement according to FIG. 2.

The entry aid E locks according to FIG. 1*e* via the locking device 5 the longitudinal adjustment of the rail longitudinal guide 15, 16 and receives again the position memory 1, 2. If the backrest 13 is completely pivoted about, then the backrest 13 latches again by the means of the latching member 17 in the hinge fitting 14 in the original adjusted upright position according to FIG. 1*a*.

If the motor vehicle seat cannot be completely moved back due to obstacles, for instance tall persons or devices in the rear back of the motor vehicle then according to FIG. 1*e* the rotational movement of the backrest 13 can be released via the entry aid lever 18. When setting the backrest 13 upright the locking device 5 is set via the actuating Bowden cable 81 and the longitudinal adjustment of the seat sub-frame 11 connected to the upper rail 15 on the lower rail 16 is locked. The position memory 1, 2 is then retrieved again when moving the motor vehicle seat backwards at next.

In the following an entry aid (easy-entry-function) for a motor vehicle seat with a memory arrangement and a position memory 1, 2 designed according to the invention is explained by the means of the FIGS. 2 to 18 as well as by the means of the FIGS. 19 to 37 with a control and release element designed according to the invention.

In FIGS. 2 to 5 the components of an entry aid component group and memory arrangement for a motor vehicle seat, which are required for understanding the construction and the functionality of the position memory according to the invention, are illustrated in isometric views as well as in longitudinal and cross-view through the component group.

The position memory 1, 2 isolated illustrated in the FIGS. 6 to 10 includes a slider 1 as adjustment means, which is mounted longitudinally displaceable on a sliding rail 100 extending in rail longitudinal direction L, and a locking element 2, which is pivotably connected to the slider 1. The slider 1 can be displaced on the sliding rail 100, which is preferably combined to a component group with the lower rail 16 of the rail longitudinal guide 15, 16 being arranged body tight, in rail longitudinal direction L in different longitudinal positions, in which said slider can then be locked by pivoting the locking element 2. The slider 1 as well as the assigned slider rail 100 consists preferably of plastic.

A current longitudinal position of the slider 1, in which the position memory 1, 2 is locked by the means of the locking element 2, corresponds in each case to a memory position in which the seat sub-frame 11 is automatically stopped when moving back out of a position being moved forward for elevating the entry.

The locking element 2 of the position memory 1, 2 comprises according to FIGS. 6 to 10 a base body 20 with a lateral slotted guide 28, 29 with two merging slotted guide sections 28 and 29 continuing in different directions for pivotably mounting of the locking element 2 on two guide bolts 101, 102, which are arranged on a base body 10 of the slider 1 or are connected in one piece to said base body. This type of a pivotable connection of the locking element 2 to the slider 1 of the position memory 1, 2 effects a displacement of the virtual rotational point of the locking element 2, which is determined by the intersection point of the normals of the slotted guide sections 28, 29, in an area below the lower rail hole pattern 160 of the lower rail 16 and optimizes the latching behaviour of the locking element 2 as explained in more detail by the means of the schematic illustration according to FIG. 11.

While a rotational point of the locking element 2 in the height of the guide piece 50 of the locking device 5 is ideal for the stop of the guide piece 50 at the position memory 1, 2 when starting a memory position after finishing the entry aid function, this rotational point being high in respect to the lower rail hole pattern 160 of the lower rail 16 would be too flat for an engagement of the engagement area 26, 27 of the locking element 2 and would be problematic for the latching behaviour of the locking element 2. By displacing the virtual rotational point D of the locking element 2 due to the slotted guide sections 28 and 29 continuing in different directions and mounted to the guide bolts 101, 102 being arranged on the base body 10 of the slider 1 in an area below the lower rail hole pattern 160 of the lower rail 16 possible latching positions of the locking device 5 are in contrast completely covered.

Due to the pivot direction of the locking element 2 and the latching direction into the lower rail hole pattern 160 the latching rail welded to the lower rail 16 is omitted and a simple, light plastic guide rail connected with low manufacturing costs can be used.

Instead of two guide bolts 101 and 102 engaging with the path curves of the slotted guide sections 28 and 29 a guide contour engaging with the slotted guide sections 28, 29 can be provided on the slider 1, what reduces further the manufacturing and assembly costs, since the slider 1 is made in a plastic injection moulding process and the guide contour is incorporated into the injection mould.

A control face 22 extends on the upper side of the locking element 2 via which the locking element 2 interacts with the control lever 3 according to FIGS. 2 to 5 and 14 to 18 in order to control the status of the locking element 2, and a locking ramp 23 being offset in respect to the control face 22, which interacts with the comfort lever 4, which releases when moving the motor vehicle seat back out of the entry position the locking of the backrest 13 being folded forwards towards the seating surface 12.

Thereby, it is to be differentiated between a status, in which a locking area 26, 27 of the locking element 2 latches into a hole 161 of the lower rail hole pattern 160 so that the position memory 1 is locked in a specific seating longitudinal position, and a status, in which the locking area 26, 27 of the locking element 2 is lifted out of the locking with the lower rail hole pattern 160 of the lower rail 16 so that the position memory 1, 2 can be moved for newly adjusting a memory position in rail longitudinal direction L.

Figure 4:
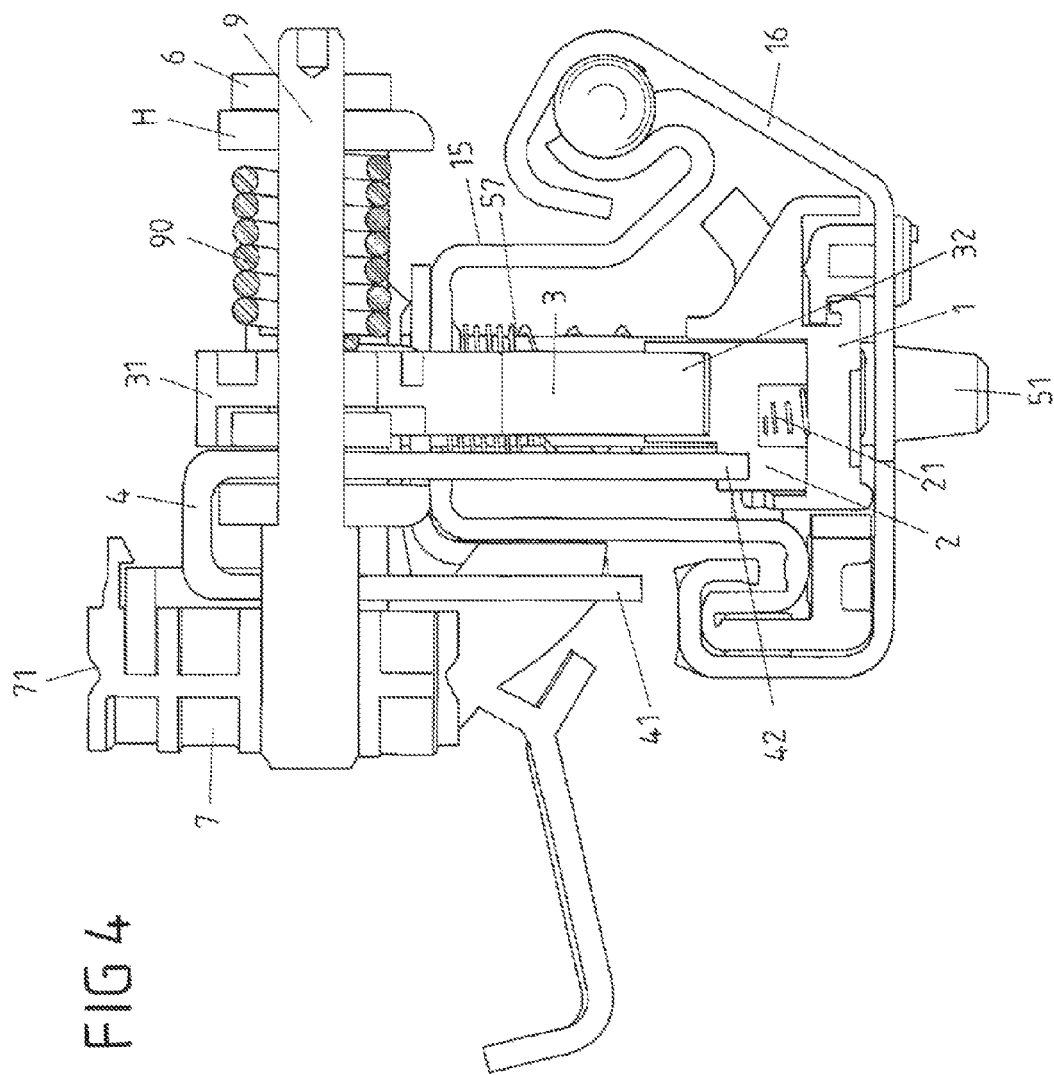
FIG. 4 shows a cross section through the locking device and memory arrangement according to FIGS. 2 and 3.
Figure 5:
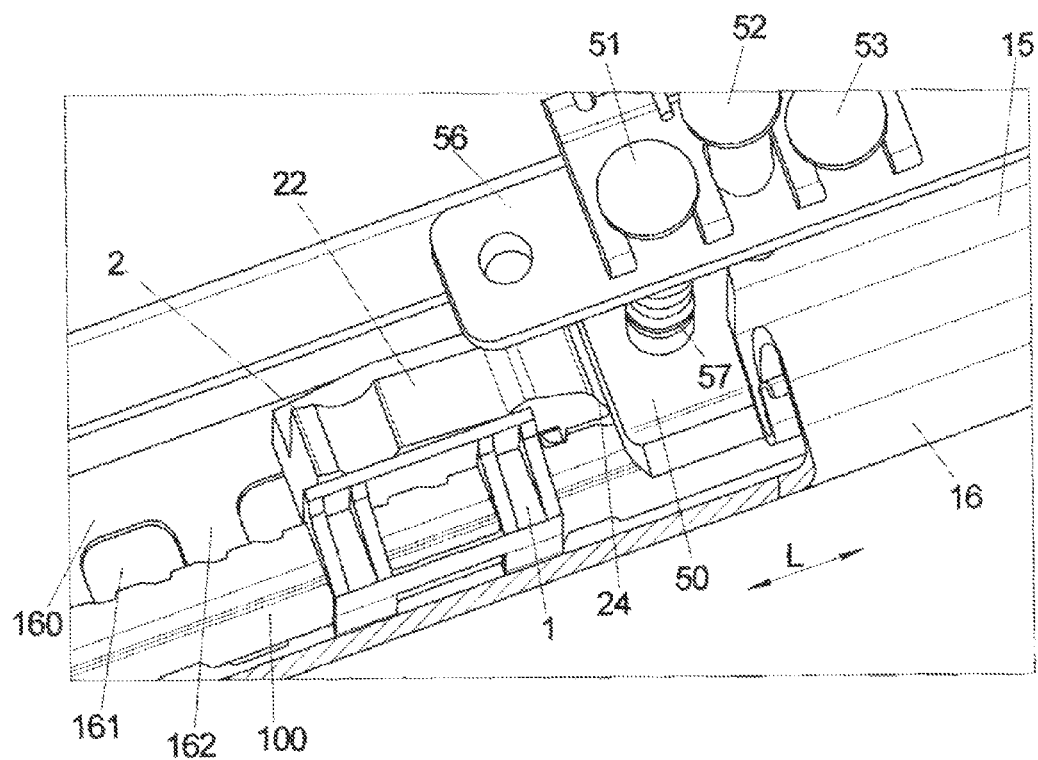
FIG. 5 shows an isometric view of the locking device and memory arrangement according to the FIGS. 2 to 4.
Figure 6:
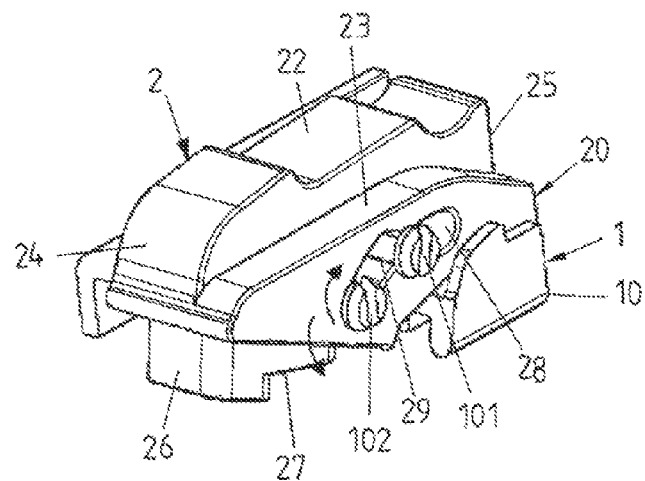
FIG. 6 shows a perspective illustration of a position memory with locking element being pivotably guided in a slider in a disengagement position.
Figure 7:
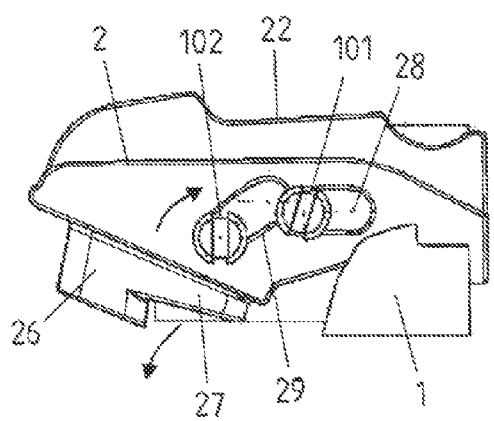
FIG. 7 shows a side view of a position memory with locking element being pivotably guided in a slider in a disengagement position.
Figure 8:
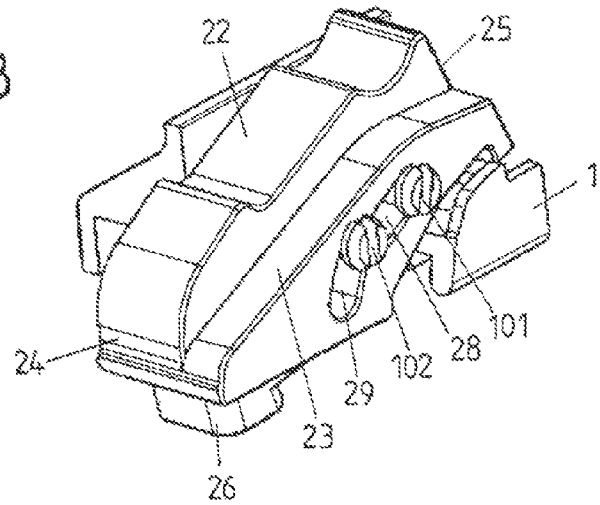
FIG. 8 shows a perspective illustration of a position memory with locking element guided pivotably in a slider in a locking position.
Figure 9:
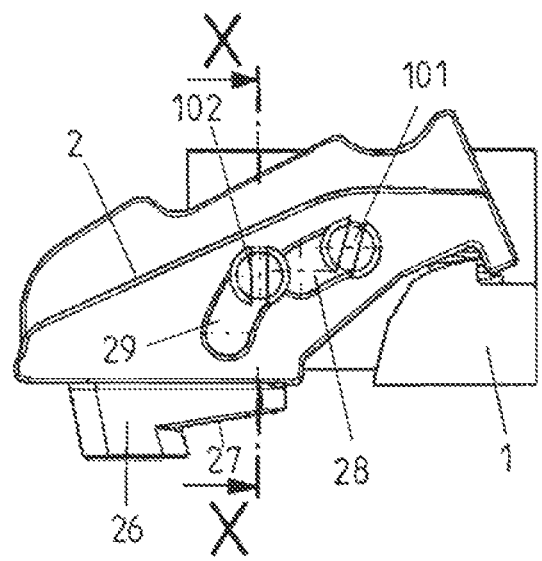
FIG. 9 shows a side view of a position memory with locking element guided pivotably in a slider in a locking position.

An elastic element, in particular in form of a helical spring 21 being introduced into the cross section by the locking device 5 and memory arrangement according to FIG. 4, is provided between the slider 1 and the locking element 2, with which the locking element 2 is preloaded in direction to the locked status so that the control lever 3 serves in particular for lifting the locking area 26, 27 of the locking element 2 out of the locking with the lower rail hole pattern 160 of the lower rail 16 against the action of the elastic element 21.

In order to be able to displace the position memory 1, 2 in rail longitudinal direction L, when the locking element 2 is lifted out of the lower rail hole pattern 160 of the lower rail 16, the locking element 2 comprises on a control face 22 ramp-like stops for a transport contour, to which the control lever 3 abuts in order to carry the position memory 1, 2 for a new adjustment of a memory position.

A stop face 24 is provided on the one front face of the locking element 2, which interacts in the locked status of the locking element 2 with a counter stop 500 on the side of the seat frame or seat rail in order to stop the seat frame in the current memory position, in which the position memory 1, 2 is stored and is latched with the lower rail hole pattern 160 of the lower rail 16, when moving back after actuating the entry aid. A stop face 25 being provided on the opposite front face of the locking element 2 serves as stop when the seat frame is moved into its backmost position, in which the stop surface 25 gets in contact to the end stop provided on the lower rail 16 being fixed to the vehicle.

Figure 12:
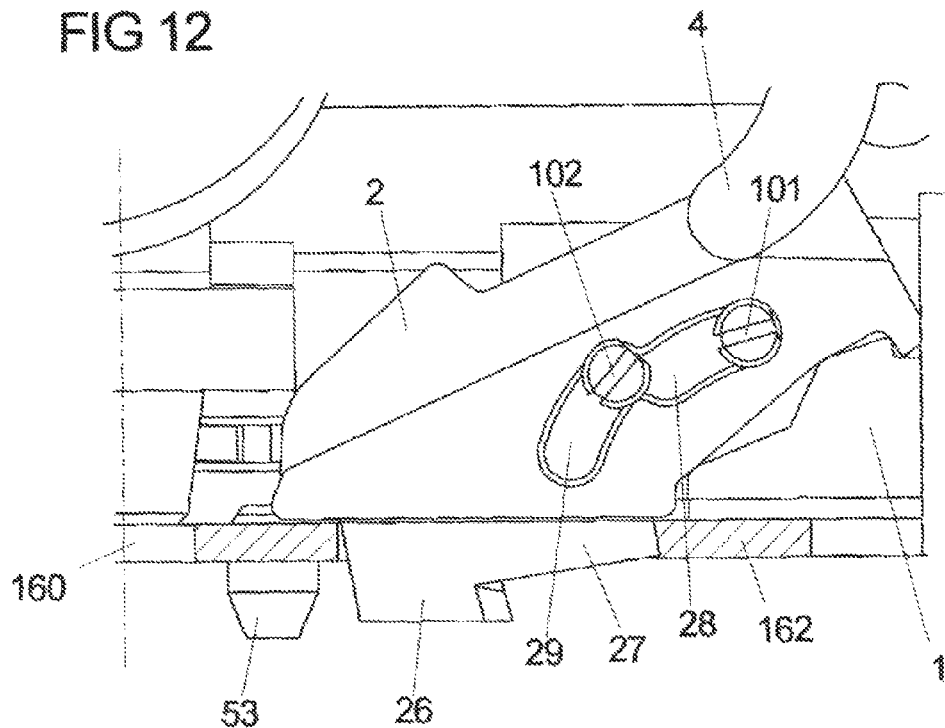
FIG. 12 shows an at least partially sectioned side view of the position memory in a latching position of the locking element in a hole of the lower rail hole pattern.
Figure 13:
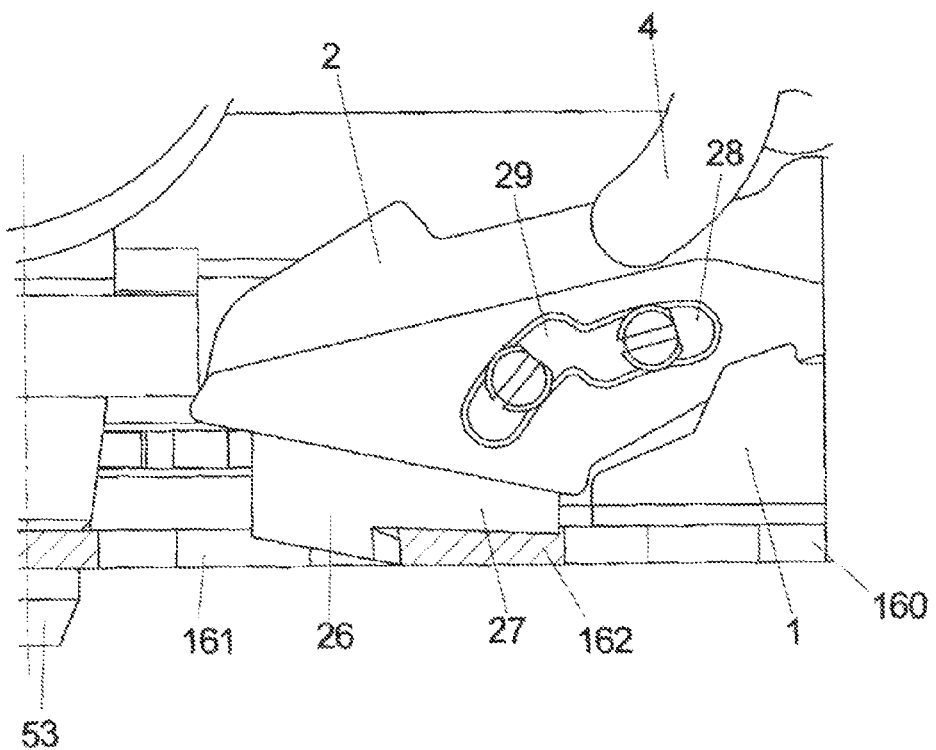
FIG. 13 shows an at least partially sectioned side view of the position memory in a latching position of the locking element on a bar of the lower rail hole pattern.

The locking element 2 comprises on its bottom side a latch nose 26 and a latch arm 27, which according to the illustration according to FIGS. 12 and 13 engage both depending on the respective latching position in a hole 161 of the lower rail hole pattern 160 or are positioned such that either the latch nose 26 engages in a hole of the lower rail hole pattern 160 while the latch arm 27 rests on a bar 162 of the lower rail hole pattern 160 or the latch nose 26 rests on a bar 162 of the lower rail hole pattern 160 and thus the latch arm 27 is also disengaged with the lower rail hole pattern 160 of the lower rail 16.

The control lever 3 is pivotably mounted on one lever end 31 of the base body 30 thereof on a bearing shaft 9, which is formed on a seating rail fixed fixing bracket H and comprises a control contour on its other lever end 32 via which said control lever interacts with the control face 22 of the locking element 2. In order to avoid an elaborate spring transmission for controlling the movement of the control lever 3 and thus the control of the position memory 1, 2 the control lever 3 comprises according to FIG. 15 on its lever end 31 being opposite to the lever end 32 with the control contour a path curve 33 continuing about the bearing shaft 9, which interacts with a cam 60 of a rocker 6, and is mounted with an elongated hole 34 on the bearing shaft 9 so that the control lever 3 is guided translationally on the bearing shaft 9, what reduces the required groove in the upper rail 15 and increases the crash safety.

The rocker 6 is connected to a pulley 7, which comprises a cable groove 70, into which a cable core 811 of an actuating Bowden cable 81 serving as a pulley means is hooked in a form fitted manner, wherein said cable core is guided in a Bowden case 810 with a Bowden support 812. The pulley 7 serves to improve the cable guide and to introduce the required empty run and overrun into the system in order to consider different cable paths for different backrest fittings without touching the kinematics of the entry aid function. The control lever 3 is coupled to the hinge fitting 14 via the rocker 6, the pulley 7 and the actuating Bowden cable 81 so that said control lever is pivoted when folding forward the backrest 13 towards the seating surface 12 of the seat sub-frame 11 after actuating the entry aid lever 18 according to the description to the FIGS. 1*a*-1*e*.

By controlling the position memory 1, 2 with a path control the translational movement is possible, which makes a recess in the upper rail 15 necessary, which however can be kept very small by the translational movement of the control lever 3. Thereby, the control occurs according to FIG. 2 via the rocker 6 being designed as a stamped part and being placed back by the means of a torsion spring 90, wherein a release contour is on said rocker, which engages into the path curve of the control lever 3.

The cable guide of the actuating Bowden cable 81 occurs by the attached pulley 7, wherein an excentric design of the Bowden cable support prevents thereby the support point of the cable towards the centre point. Thus, the unlocking force and the path of the Bowden cable can be changed by providing a large pivot angle at the beginning of the actuation and thus a fast actuation of the system and the rocker 6 rotates only minimal by unlocked longitudinal adjustment until the backrest 13 is latched.

A U-shaped comfort lever 4 is pivotably mounted with a bearing point provided in its base body 40 on the same bearing shaft 9 as the control lever 3. The comfort lever 4 is connected on the one lever end 41 to a pulling means in form of a cable core guided in a Bowden case with Bowden support of the Bowden cable 82 illustrated in the FIGS. 1a to 1e. The other lever end 42 of the comfort lever 4 interacts with the locking ramp 23 of the locking element 2 of the position memory 1, 2, when the seat sub-frame 11 starts the presently adjusted memory position. The comfort lever 4 serves the unlocking of the locking mechanism with which the backrest 13 can be locked in its status folded forward to the seating surface 12 of the seat sub-frame 11, wherein said comfort lever acts on the locking mechanism via the assigned Bowden cable 82 according to the description to the FIGS. 1a to 1e.

The locking device 5 comprises according to FIGS. 2 to 5 a guide piece 50 connected to the upper rail 15, the seat frame sided or seat rail sided counter stop 500 thereof engages with the stop face 24 of the locking element 2 of the position memory 1, 2 in order to hold the motor vehicle seat in a seating longitudinal position stored as memory position. A guide piece 50 comprises two guide openings for the longitudinal guide of locking pins 51, 52, 53, which serve for arresting the rail longitudinal guide 15, 16. An unlocker 54 pivotably mounted in the housing of the locking device 5 is connected to an unlocking sheet 56, that reaches beneath plate-like heads of the locking pins 51, 52, 53 and which is preloaded with a torsion spring 55. The three locking pins 51, 52, 53 of the locking device 5 are preloaded by the means of helical springs 57 elastically in direction to the lower rail hole pattern 160 of the lower rail 16. Due to the preloading acting on the locking pins 51, 52, 53 the locking pins 51, 52, 53 assigned to the upper rail 15 latch automatically into the holes 161 of the body fixed lower rail hole pattern 160 so that the seating longitudinal adjustment is arrested, if the locking pins 51, 52, 53 are not disengaged via the unlocking sheet 56 with the latching device of the lower rail hole pattern 160 by the means of the unlocker 54 provided therefore.

Since the unlocker 54 of the locking device 5 is preloaded by the means of the torsion spring 55 and the helical spring 57 acting on the locking pins 51, 52, 53 against the direction in which the unlocker 54 has to be pivoted for unlocking the locking device 5, the locking device 5 can only be unlocked if a force is exerted onto the unlocker 54 against the action of the torsion spring 55 and of the helical spring 57 preloading the locking pins 51, 52, 53.

The unlocker 54 can be actuated directly on the one hand by a user of the seat for unlocking the locking device 5 such that said user grasps an actuating handle provided therefore at an actuating lever, which is pivotably hinged to the seat frame, and pivots said lever whereby the unlocker 54 moves downwards against the preload of the springs 55, 57. On the other hand, the locking device 5 can be also unlocked by folding forward the backrest 13, what for the backrest 13 is coupled to the entry aid lever 18 via the actuating Bowden cable 81.

The lower rail hole pattern 160 is integrated into the lower rail 16 of the rail longitudinal guide 15, 16 and is formed by a majority of locking openings arranged one after the other in rail longitudinal direction L and separated from each other by bars 161 or is formed by holes 161, into which the locking pins 51, 52, 53 of the locking device 5 engage in order to arrest the rail longitudinal guide 15, 16 in a longitudinal position adjusted beforehand.

Thereby, the engagement area of the locking element 2 formed by the latch tooth 26 and the latch arm 27 is designed such that also this engagement area 26, 27 can engage into the holes 161 of the lower rail hole pattern 160 of the lower rail 16 in order to lock the position memory 1, 2 in a defined longitudinal position. Thus, one and the same locking openings or holes 161 are used for arresting the rail longitudinal guide 15, 16 by the means of the locking pins 51, 52, 53 of the locking device 5 as well as for locking the position memory 1, 2 of the memory component by the means of the engagement area 26, 27 formed on the locking element 2.

The fixing bracket H forms together with the components mounted thereto, in particular the control lever 3 and the comfort lever 4 a pre-assembled module, which can be mounted to the upper rail 15 of a seat frame in a complete pre-assembled manner. Thereby, the comfort lever 4 can be provided optionally only for the case in which the seat frame is provided with a locking mechanism for locking the backrest 13 in the folded status.

The further unlocking Bowden cable 84 being operatively connected via the entry aid E to the backrest 13 for coupling the backrest 13 to the locking device 5 of the rail longitudinal guide 15, 16 releases when folding forward the backrest 13 towards the seating surface 12 of the seat sub-frame 11 the locking device 5 so that the rail longitudinal guide 15, 16 can be displaced towards each other for moving forward the seat frame. The unlocking Bowden cable 84 is coupled via the rocker 6 described above to the backrest 13, wherein the unlocking Bowden cable 84 can accommodate via a distance piece a relatively large angular movement of the rocker 6. When pivoting the rocker 6 a movement of the case of the unlocking Bowden cable 84 is effected along the Bowden cable axis, which is used for unlocking the locking device 5.

Figure 11:
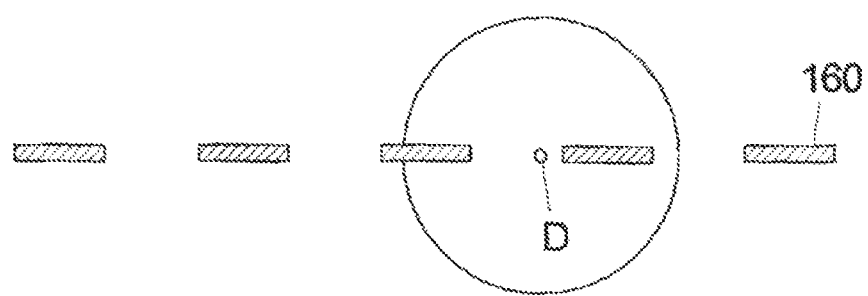
FIG. 11 shows a schematic illustration of the rotational point of the locking element of the position memory.

In the following the motion sequence of the components of the entry aid control unit E is explained in more detail by the means of the FIGS. 14 to 18 in combination with the construction of the position memory 1, 2 illustrated in the FIGS. 6 to 10 and the motion sequence of the position memory 1, 2 illustrated in the FIGS. 11 to 13.

Figure 14:
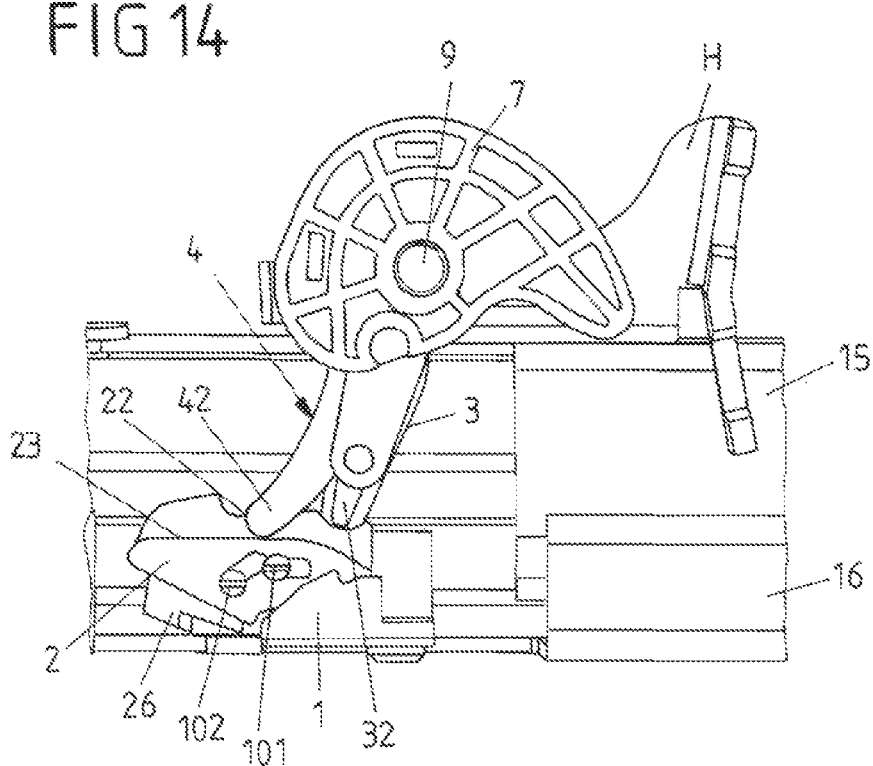
Figure 15:
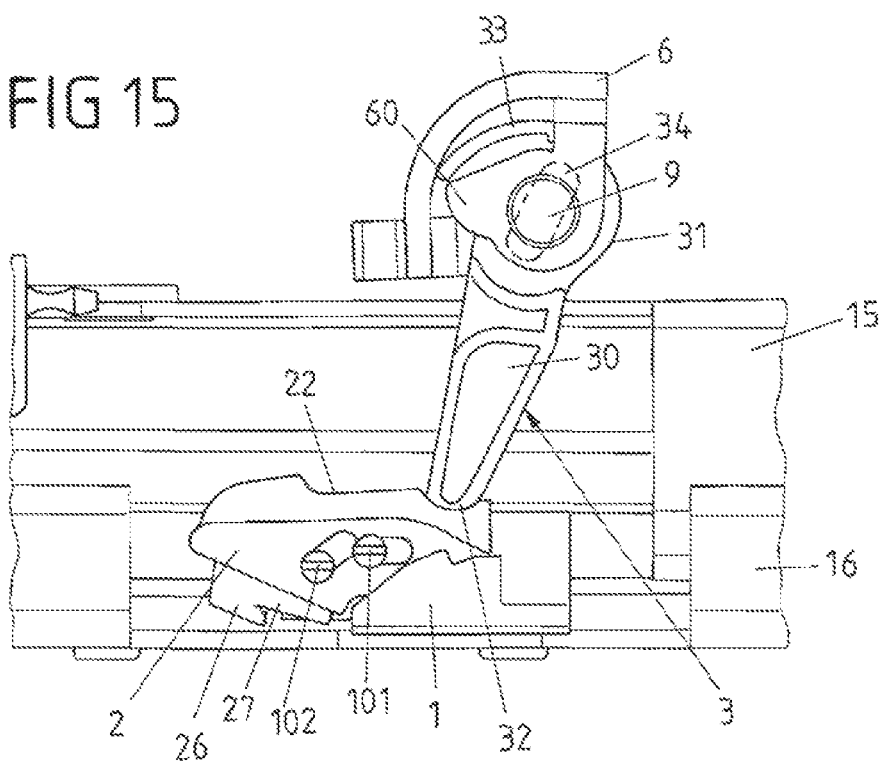

In the entrainment position of the position memory 1, 2 shown in the FIGS. 14 and 15, which corresponds to an upward backrest 13 being in use position, the locking area 26, 27 of the locking element 2 is not in engagement with a hole 161 of the lower rail hole pattern 160 of the lower rail 16 but is lifted out of the lower rail hole pattern 160 of the lower rail 16. This is attributed to the fact that the control lever 3 acts with the control contour formed on the one lever end 32 of the base body 30 onto the assigned control face 22 of the locking element 2 such that it is kept in a pivot position, in which the locking area 26, 27 of the locking element 2 is disengaged with the lower rail hole pattern 160 of the lower rail 16. The comfort lever 4 abuts with its lever end 42 on the locking ramp 23 of the locking element 2 and thus releases the locking of the backrest 13.

The position of the control lever 3, in which said lever acts with the control contour formed on its one lever end 32 on the assigned control face 22 of the locking element 2, corresponds to the normal position or normal pivot position of the control lever 3, in which it is elastically preloaded by the means of a torsion spring 90 acting on the rocker 6. In this status the control lever 3 engages with its one lever end 32 provided with the control contour at the transport area of the control path 22 of the locking element 2, so that when displacing the seat-frame with backrest 13 being in use position the slider 1 and thus the position memory 1, 2 is being entrained along in its whole by the control lever 3.

As a result in case of a backrest 13 being in upright use position, the position memory 1, 2 is entrained during each new adjustment of the seat longitudinal position of the seat frame via the control lever 3 so that the memory position defined by the position of the position memory 1, 2 is in each case adapted to the current comfort position of the seat-frame in rail longitudinal direction L. This is possible since the locking element 2 is lifted out of the lower rail hole pattern 160 of the lower rail 16 by the means of the control lever 3 in case of an backrest 13 being in upright use position.

Figure 16:
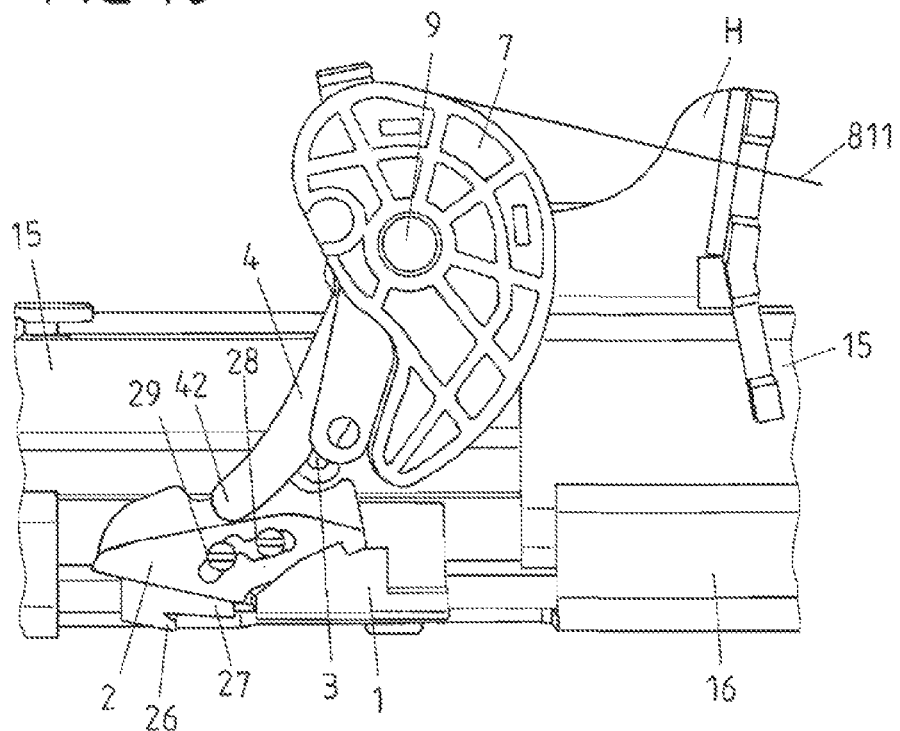
Figure 17:
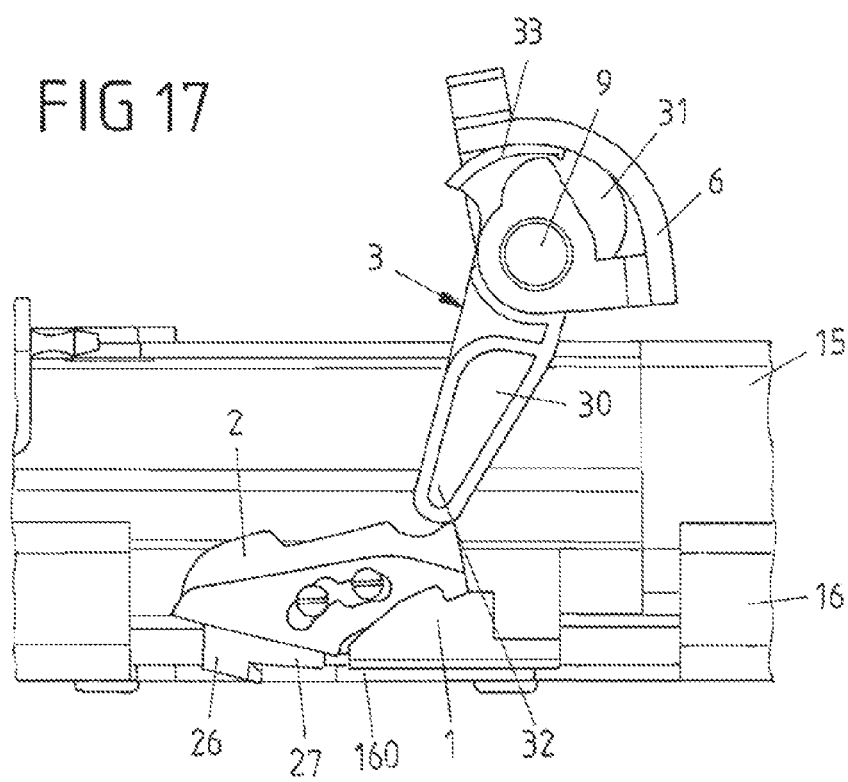

The deposition of the locking element 2 of the position memory 1, 2 after folding forward the backrest 13 in direction towards the seat surface 12 of the seat frame is schematically illustrated in the FIGS. 16 and 17. Hereby the actuating Bowden cable 81 illustrated in the FIGS. 2 and 3 acts with its pulling means 811 onto the pulley 7 and the rocker 6 connected to the pulley 7, which rotates about the bearing shaft 9. Due to the cam 60 arranged on the rocker 6 the control lever 3 is lifted via its path curve 33 arranged on the lever end 31 and due to its elongated hole connection 34 to the bearing shaft 9, is thus being disengaged with the control face 22 of the locking element 2 and thus does not act any longer onto said control face. Through this the locking element 2 is pivoted by the action of the preloading of the elastic element formed as a helical spring 21 counter clock wise such that the locking area 26, 27 of the locking element 2 shows the tendency to engage into the lower rail hole pattern 160 of the lower rail 16.

The type of engagement of the locking area 26, 27 of the locking element 2 with the lower rail hole pattern 160 of the lower rail 16 depends on the latching position of the locking pins 51, 52, 53 of the locking device 5 in respect to the lower rail hole pattern 160 of the lower rail 16. While in the latching position according to FIG. 17 the latch nose 26 and the latch arm 27 of the locking element 2 engage in a hole 161 of the lower rail hole pattern 160, only the latch nose 26 engages in the latching position according to FIG. 13 in a hole 161 of the lower rail hole pattern 160, while the latch arm 27 rests on a bar 162 being there between. Due to the pivoting of the locking element 2 in the height of the lower rail hole pattern 160 according to the invention there is in both cases however a stable latching position, since the force introduction into the lower rail 16 is below the rotational point of the locking element 2 so that no loss of the stored position is to be suspected when rotating the locking element 2 out of the lower rail 16 when stopping the stop face 500 of the guide piece 50 of the locking device 5 at the position memory 1, 2.

Thereby the stop face 500 is provided at the guide piece 50 of the locking device 5 such that the locking element 2 is pressed into the lower rail 16 due to the force components. In addition the anchoring or latching of the locking element 2 with the lower rail hole pattern 160 of the lower rail 16 is supported by the use of a locking element 2 made of sintered material, having the essential advantage that the contour of the lower rail hole pattern 160 of the lower rail 16 can be reproduced. While a locking element 2 made of steel has straight edges, which do not correspond to the radii of the lower rail hole pattern 160, a locking element 2 made of sintered material can be provided with radii so that the locking element 2 can use the complete hole width of the lower rail hole pattern 160 of the lower rail 16 for abutment, that means the radii at the locking area 26, 27 of the locking element 2 can be used for support since the radii formation has already been considered in the tool for manufacturing the locking element 2 made of sintered material. In addition the surface pressure and as a result thereof a deformation at the locking element 2 and the lower rail hole pattern 160 of the lower rail 16 is thereby avoided.

In the position shown in FIG. 16 when depositing the locking element 2 in the lower rail hole pattern 160 of the lower rail 16 the lever end 41 of the comfort lever 4 sits still on the locking ramp 23 of the locking element 2 and thus releases the locking of the backrest 13.

Figure 18:
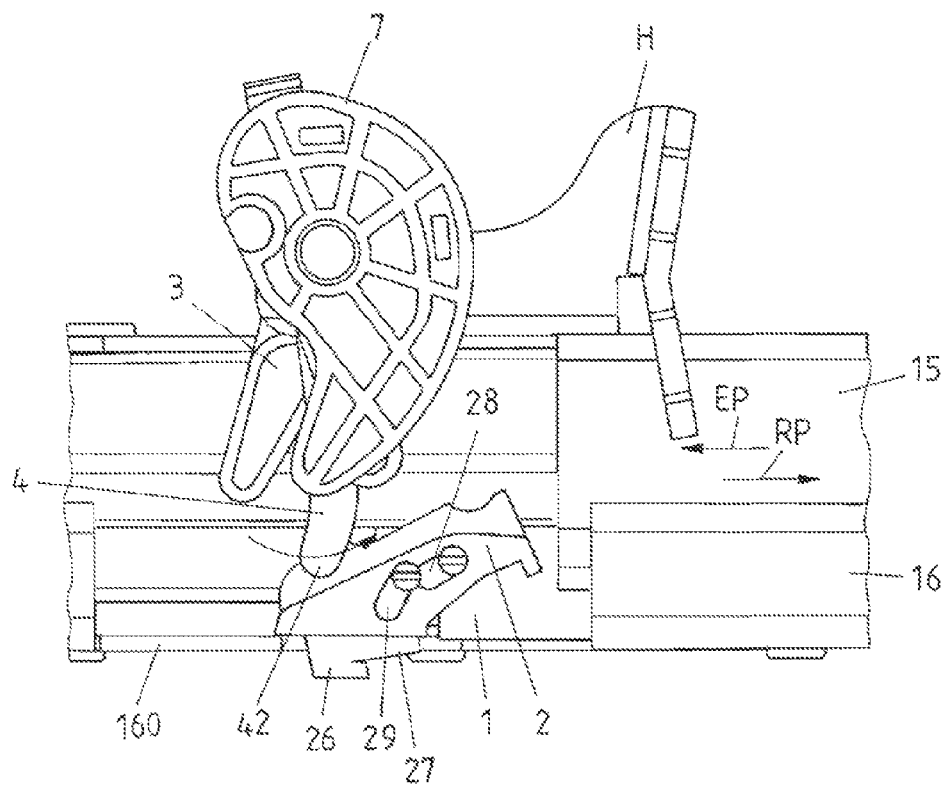

FIG. 18 shows the locking element 2 being deposited in the lower rail hole pattern 160 of the lower rail 16, which engages with its latch nose 26 and optionally with its latch arm 27 in a hole 161 of the lower rail hole pattern 160 of the lower rail 16 and thus secures the memory position. If after the deposition of the position memory 1, 2 by latching the locking element 2 with at least its latch nose 26 in a hole 161 of the lower rail hole pattern 160 of the lower rail 16 the seat frame is moved for alleviating the entry forward in direction of the arrow EP shown in FIG. 15 into an entry aid position, then the comfort lever 4 pivots according to the arrow shown in FIG. 15 against the moving direction of the seat frame backwards so that via the connection of the comfort lever 4 via the release Bowden cable 82 to the latching lever 19 the backrest 13 is latched in its folded forward position according to the schematic illustration according to FIG. 1c.

If the position memory 1, 2 is locked in the such adjusted seat longitudinal position as memory position and if the seat frame is moved with folded forward backrest 13 after exerting the entry aid function in direction of the arrow RP backwards into a latching position then the comfort lever 4 being pivotably hinged to the seat frame or seat rail fixed fixing bracket H approaches the position memory 1, 2. Thereby the comfort lever 4 slides with its lever end 42 over the locking ramp 23 of the locking element 2, wherein the comfort lever 4 is being pivoted clockwise about the bearing shaft 9 such that said lever exerts a pulling force on the cable core of the releasing Bowden cable 82, which is connected to the latch lever 19 of the locking mechanism of the folded forward backrest 13 so that said lever unlocks the locking mechanism according to the schematic illustration according to FIG. 1e.

As a result the seat frame can be immediately arrested after starting the memory position by folding up the backrest 13 in the acquired seat longitudinal position. Hereby it is important that at first the locking element 2 is lifted out of the lower rail hole pattern 160 of the lower rail 16 and thereby or afterwards the complete engagement of the control lever 3 into the entrainment contour of the locking element 2 occurs.

Thus the backrest 13 can be folded in its upright use position, wherein the control lever 3 occupies again its normal position under the action of the torsion spring 90, since the actuating Bowden cable 81, via which the control lever 3 is coupled to the backrest 13, does not act anymore against the action of the arms of the torsion spring 90 onto the control lever 3. Hereby the control lever 3 affects with its lever end 32 forming a control contour a stop with the assigned control face 22 of the control lever 2 and lifts the locking area 26, 27 of the locking element 2 against the action of the helical spring 21 preloading the locking element 2 against the slider 1 out of the lower rail hole pattern 160 of the lower rail 16. The memory device is then again in the status illustrated in FIG. 14, in which the position memory 1, 2 can be entrained after a displacement of the seat frame with upright backrest 13 being in a use position for newly adjusting a memory position.

Simultaneously to the unlocking of the locking mechanism for the folded forward backrest 13 the counter stop 500 of the guide piece 50 of the locking device 5 gets in abutment with the assigned stop face 24 of the locking element 2 being still in the locked status so that the seat frame is halted according to the schematic illustration according to FIG. 1d, after the comfort lever 4 was pivoted when overriding the locking ramp 23.

When the control lever 3 engages into the control path 22 of the locking element 2 the unlocking Bowden cable 84 connected to the rocker 6 is being pulled and affects an actuating of the locking device 5, which blocks the longitudinal adjustment of the rail longitudinal guide 15, 16. If the backrest 13 is completely pivoted then the backrest 13 latches again by the means of the latching member 17 in the hinge fitting 14 in the originally adjusted upright position according to FIG. 1a.

The forces exerted by the counter stop 500 onto the stop face 24 of the locking element 22 when starting the memory position are transferred via the base body 20 of the locking element 2 and the locking area 26, 27 directly into the lower rail 16 so that the slider 1 serving the mounting of the locking lever 2 as well as the assigned slider guide 100 for the slider 1 can be made of plastic due to the less strain cost efficient and weight saving. Furthermore due to the direct transfer of the forces acting on the locking element 2 into the lower rail 16 the bearing shaft of the guide bolts 101, 102 formed on the base body 10 of the slider 10 is released. The remaining residual forces, which still act on the slider 1, press said slider against the lower rail 16 so that also these forces are transferred into the lower rail 16.

Due to the inclined gradient of the stop face 24 of the locking element 2 in respect to the rail longitudinal direction L (inclined in an angle of less than 90°) the counter stop 500 formed at the guide piece 50 acts additionally against a lifting of the engagement area 26, 27 of the locking element 2 out of the respective hole 161 of the lower rail hole pattern 160 of the lower rail 16.

The construction and the function of the control and release element is being explained in more detail by the previously described FIGS. 2 to 6 and by the means of the subsequently described FIGS. 19 to 37.

The control element 3, 6 for controlling the position memory 1, 2, which affects the locking of the memory device when folding forward the backrest 13, is illustrated in different views in the FIGS. 19 to 29. The control element 3, 6 consists of the control lever 3 interacting with the control face 22 of the locking element 2 of the position memory 1, 2 and the rocker 6 controlling the control lever 3 and being operatively connected to the actuating Bowden cable 81.

Figure 19:
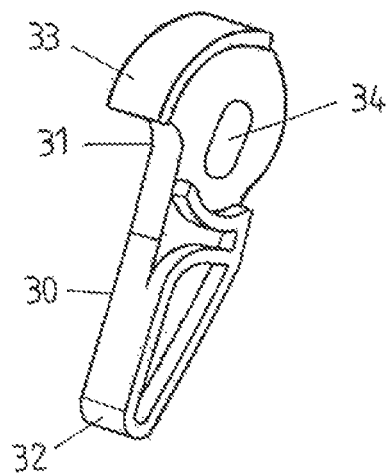
FIG. 19 shows an isometric view of the control lever of the control element according to the invention.
Figure 20:
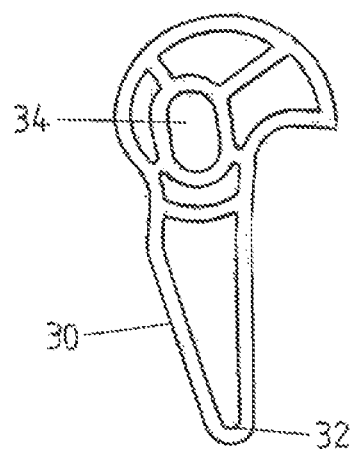
FIG. 20 shows a side view of the control lever of the control element according to the invention.

The control lever 3 illustrated in the FIGS. 19 and 20 in an isometric view and a side view comprises a base body 30, at one lever end 32 thereof a control contour is provided, which rests on the control face 22 of the locking element 2 of the position memory 1, 2 for lifting the locking element 2 out of the locking with the lower rail hole pattern 160 of the lower or locking rail 16 or is lifted from the control face 22 of the locking element 2 such that the locking area 26, 27 of the locking element 2 engages with the lower rail hole pattern 160 of the locking rail 16 for locked deposition of the position memory 1, 2 under the action of the helical spring 21 being effective between the slider 1 and the locking element 2. On its opposite lever 31 the control lever 3 comprises an elongated hole 34, which is attached to the bearing shaft 9 being connected to the fixing bracket 9 and which guides the control lever 3 in a translational movement along the bearing shaft 9. The lever end 31 of the control lever 3 comprises a control curve 33 adjacent to the elongated hole 34, wherein said curve continues arc shaped about the elongated hole 34.

Figure 21:
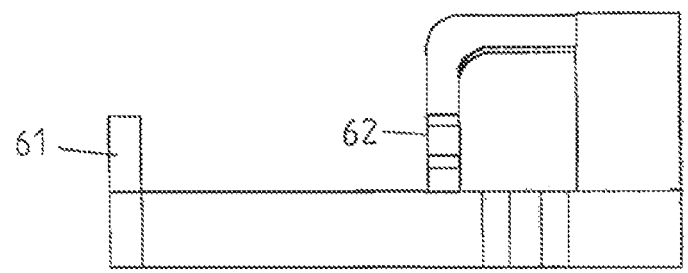
FIG. 21 shows a front side view of the rocker of the control element.
Figure 22:
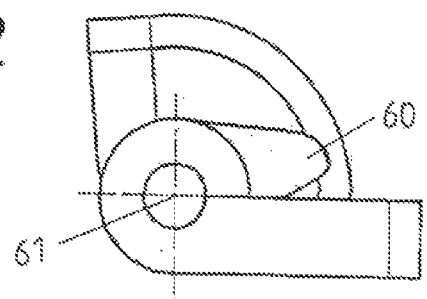
FIG. 22 shows a side view of the rocker of the control element.
Figure 23:
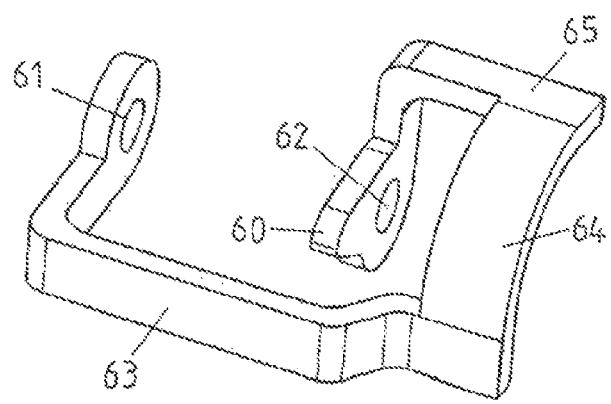
FIG. 23 shows an isometric view of the rocker of the control element.

The rocker 6 of the control element 3, 6 illustrated in the FIGS. 21 to 23 in a front view, side view and isometric view comprises a base body 63, 64, 65 with a bar 63 continuing parallel to the bearing shaft 9, an arc shaped bar 64 as well as a connecting bar 65 and bearing positions 61, 62 with bearing bores arranged on the ends of the base body 63, 64, 65, which are mounted onto the bearing shaft 9. A control cam 60 is formed on the one bearing position 62, wherein said cam interacts with the control curve 33 of the control lever 3 and effects the translational movement of the control lever for controlling the locking element 2 of the position memory 1, 2 in a way of a cam shaft arrangement.

In FIGS. 24 to 29 the interaction of the control lever 3 and the rocker 6 of the control element 3, 6 is illustrated in different views during entrainment of the position memory 1, 2 for changing a memory position as well as during deposition of the position memory 1, 2 in a memory position.

Figure 24:
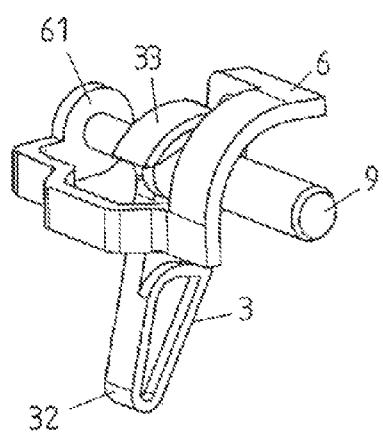
FIG. 24 shows an isometric view of the control element in a position carrying along the position memory.
Figure 25:
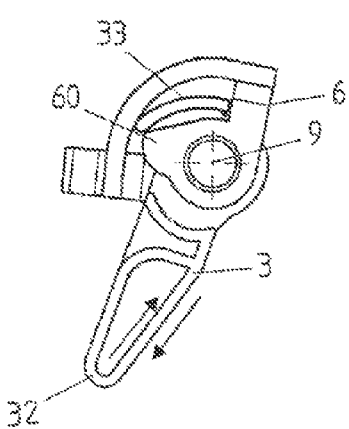
FIG. 25 shows a side view of the control element in a position carrying along the position memory.
Figure 26:
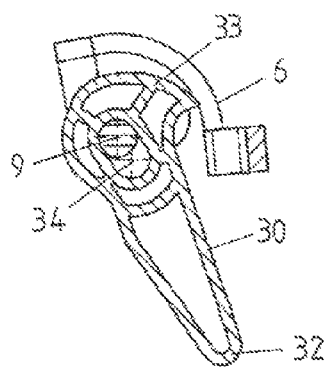
FIG. 26 shows a sectional view of the control element in a position carrying along the position memory.

FIGS. 24 to 26 show in an isometric view, a side view and a sectional view the control element 3, 6 when entraining the position memory 1, 2. The rocker 6 is mounted with its bearing positions 61, 62 and the control lever 3 with its elongated hole 34 onto the bearing shaft 9, wherein the control cam 60 of the rocker 6 rests against the control curve 33 of the control lever 3 in a position in which the control lever 3 is lowered so that said lever presses with its control contour formed on the one lever end 32 onto the control face 22 of the locking element 2 of the position memory 1, 2 and thus lifts the engagement area 26, 27 of the locking element 2 against the helical spring 21 being effective between the slider 1 and the control element 2 out of the lower rail hole pattern 160 of the lower rail 16. In this position of the control element 3, 6 the position memory 1, 2 can be entrained along the rail longitudinal guide for adjusting a new memory position.

Figure 27:
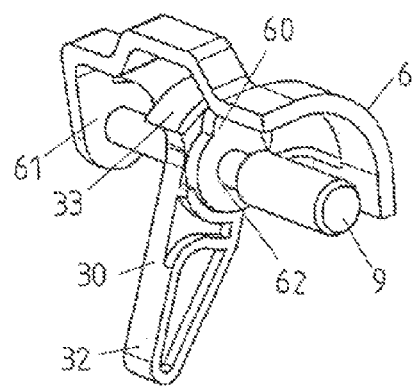
FIG. 27 shows an isometric view of the control element in a position removing the position memory and anchoring the position memory.
Figure 28:
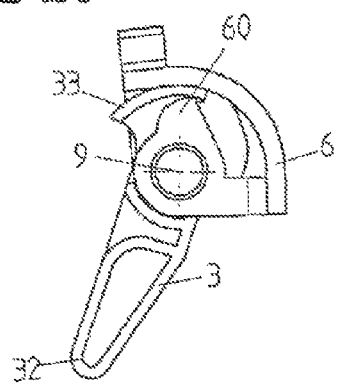
FIG. 28 shows a side view of the control element in a position removing the position memory and anchoring the position memory.
Figure 29:
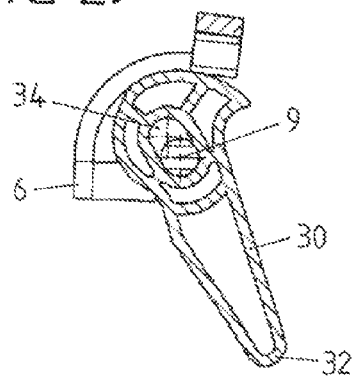
FIG. 29 shows a sectional view of the control element in a position removing the position memory and anchoring the position memory.

In FIGS. 27 to 29 the control element 3, 6 is illustrated in an isometric view, a side view and in a sectional view when depositing the position memory 1, 2. By pivoting the rocker 6 clockwise about the bearing shaft 9 in respect to the alignment of the rocker 6 in the entrainment position of the position memory 1, 2 illustrated in the FIGS. 24 to 26 the control cam 60 of the rocker 6 slides along the control curve 33 of the control lever 3 and translational lifts the control lever 3 along the bearing shaft 9 so that according to FIG. 29 the bearing shaft 9 comes into abutment at the upper end of the elongated hole 34 of the control lever 3. In this position the control lever 3 is lifted in respect to the control face 22 of the locking element of the position memory 1, 2 such that the locking area 26, 27 of the locking element 2 engages by the action of the helical spring 21 being effective between the slider 1 and the locking element 2 into the lower rail hole pattern 160 of the lower rail 16 for anchoring the position memory 1, 2.

By guiding the control lever 3 in an elongated hole 34 along the bearing shaft 9 and controlling the control lever 3 by the means of the control cam 60 of the rocker 6 along the control path 33 the translational movement of the control lever 3 is obtained, which only requires a small recess in the upper rail 15 of the rail longitudinal guide 15, 16. The rocker 6 is preferably provided as a punched part and is placed back by the means of the torsion spring 90 illustrated in FIG. 2.

The cable guide of the actuating Bowden cable 81 for pivoting the rocker 6 about the bearing shaft 9 occurs in this embodiment by the pulley 7 mounted onto the bearing shaft 9 according to FIGS. 2 to 5 and being connected to the rocker 6. An eccentric positioning of the Bowden cable support of the pulley 7 changes thereby the support point of the cable 811 of the actuating Bowden cable 81 to the bearing shaft 9. Through this the unlocking force and the Bowden cable path of the actuating Bowden cable 81 can be changed in the way that at the beginning of the actuation a large pivoting and thus a large actuation of the control element 3, 6 occurs while after the unlocking of the locking device 5 the pulley 7 and thus the rocker 6 are only minimal rotated until the backrest 13 latches.

In contrast to an even unlocking by the means of an circular pulley, during which the locking area of the position memory 1, 2 is pushed out of the lower rail and which completely compresses the spring preloading the locking area to an engagement into the lower rail hole pattern and plastically deforms it, the locking device 5 is rather actuated during an eccentric release and the system is not maximal hinged. Thereby it is secured that at first the position memory 1, 2 latches into the lower rail 16 before the longitudinal adjustment is released by unlocking the locking device 5. Through this the storing of a memory position is secured before moving forward the motor vehicle seat.

Figure 32:
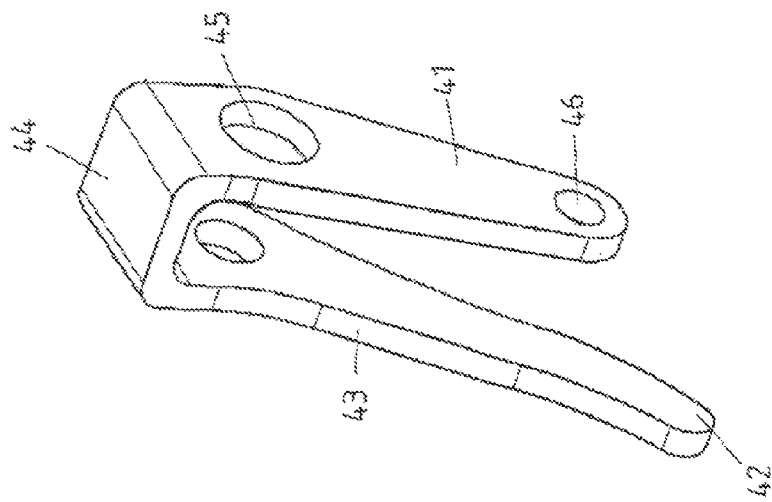
FIG. 32 shows an isometric view of the U-shaped comfort lever.
Figure 31:
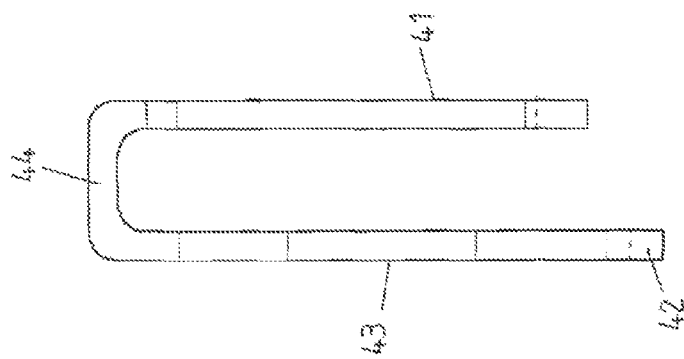
FIG. 31 shows front view of the U-shaped comfort lever.
Figure 30:
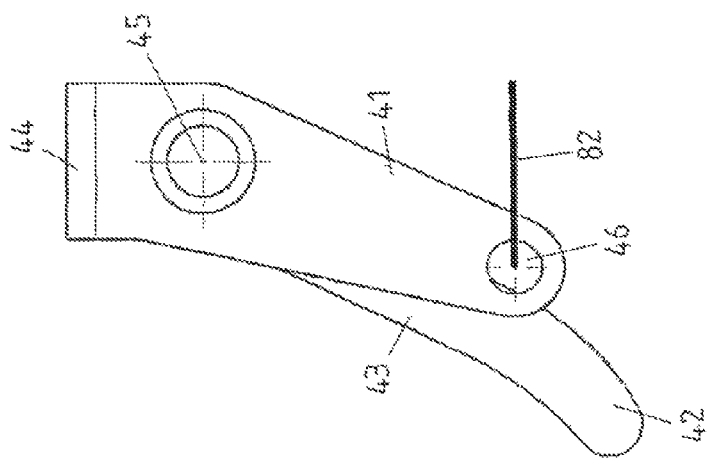
FIG. 30 shows a side view of the U-shaped comfort lever.

The comfort function is triggered by a U-shaped comfort lever 4 illustrated in the FIGS. 30 to 32 in a side view, a front view and an isometric view.

The U-shaped comfort lever 4 is formed as a simple punched part and is mounted between the pulley 7 and the rocker 6 of the control element 3, 6. Said lever comprises two arms 42 and 43 being connected to each other via connecting arm 44 and continuing parallel to each other, wherein on the ends thereof being adjacent to the connecting arm 44 bores 45 being aligned to each other are arranged, with which the comfort lever 4 is mounted onto the bearing shaft 9. At the end of the first arm 41 a bore 46 for mounting the cable of the unlocking Bowden cable 81 according to FIGS. 1a to 1e for unlocking the locking mechanism when starting the memory position after exerting the entry aid function is provided. The lever end 42 of the second arm 43 interacts in contrast with the locking ramp 33 of the locking element 2 of the position memory 1, 2. A predefined rotational angle is adjusted by a corresponding Bowden cable path of the unlocking Bowden cable 82, with which the comfort lever 4 is pivoted about the bearing shaft 9 and pushes the position memory 1, 2 into the lower rail hole pattern 160 and guarantees a latching of the position memory 1, 2 in the lower rail hole pattern 160 of the lower rail 16. Due to the form closure between the locking element 2 and the lower rail hole pattern 160 and the force in Z-direction of the comfort lever 4 the locking element 2 of the position memory 1, 2 is pushed into the lower rail hole pattern 160.

Due to the U-shaped configuration of the comfort lever 4 the prerequisite is provided that the comfort lever 4 does not have to be guided through a large recess on the side of the upper rail 15 of the rail longitudinal guide 15, 16 out of the intermediate space formed between the upper rail 15 and the lower rail 16, but can be mounted through a small recess on the upper side of the upper rail 15 whereby an optimal stability of the upper rail 15 and thus a high crash stability of the rail longitudinal guide 15, 16 is guaranteed.

It is being pointed to the previous description of the FIGS. 14 to 18 for explaining the motion sequence of the components of the entry aid and memory device in connection with the control element 3, 6 and the comfort lever 4.

Figure 36:
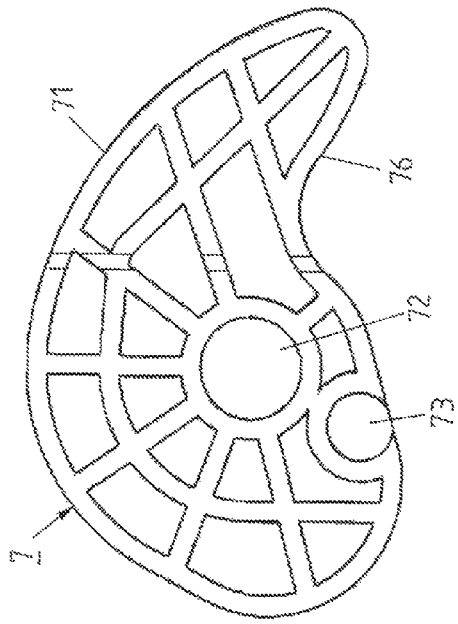
FIG. 36 shows a pulley applicable as an adapter in a side view.
Figure 35:
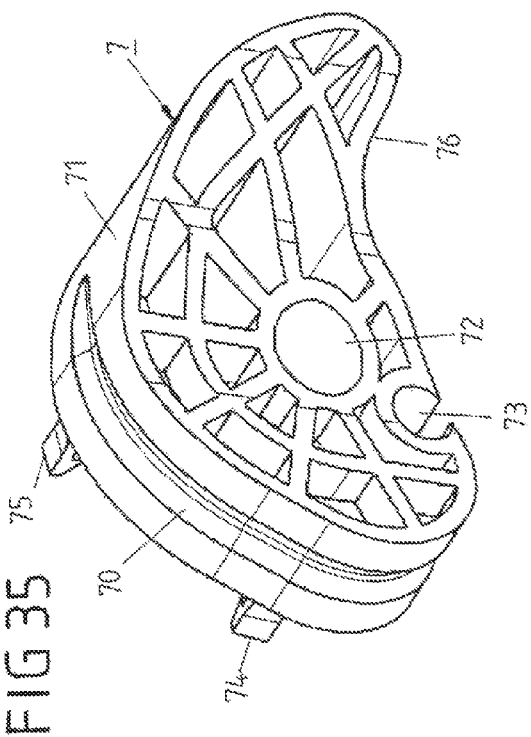
FIG. 35 shows a pulley applicable as an adapter in an isometric view.
Figure 37:
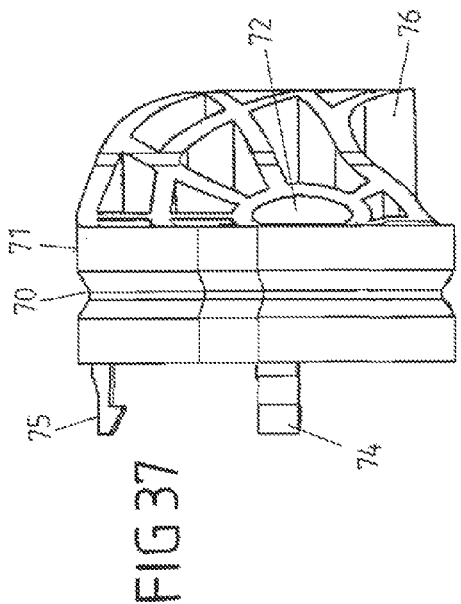
FIG. 37 shows a pulley applicable as an adapter in a top view.

The control lever illustrated in the FIGS. 33 and 34 and the pulley illustrated in the FIGS. 35 to 37 allow the use and the application of an entry aid and memory device being optimally designed in respect to their functionality for different hinge fittings or motor vehicle seats of different manufacturers without that an adaptation of the control chain from actuating lever to entry aid and memory device for instance by the use of adjustable Bowden cables for tolerance compensation has to be done or a sufficient empty run or over run has to be introduced into the system in order to consider the different cable paths of the different rest fittings.

In the FIGS. 33 and 34 the control element 3, 6 for controlling the position memory 1, 2, which effects the locking of the memory device when folding forward the backrest 13, is shown in analogy to FIGS. 24 and 27 in different views when entraining the position memory 1, 2 for changing a memory position as well as when depositing the position memory 1, 2 in a memory position. The control element 3, 6 consists of the control lever 3 interacting with the control face 22 of the locking element 2 of the position memory 1, 2 and the rocker 6 controlling the control lever 3 and being operatively connected to the actuating Bowden cable 81.

FIG. 33 shows in an isometric view the control element 3, 6 when entraining the position memory 1, 2. The rocker 6 is mounted with bearing points 61, 62 and the control lever 3 with an elongated hole to the bearing shaft 9, wherein a control cam 60 of the rocker 6 rests against a control curve 33 of the control lever 3 in a position in which the control lever 3 is lowered so that said lever pushes with its control contour formed at the one lever end 32 onto the control face 22 of the locking element 2 of the position memory 1, 2 and thus lifts the engagement area 26, 27 of the locking element 2 against the helical spring 21 being effective between the slider 1 and the locking element 2 out of the lower rail hole pattern 160 of the lower rail 16. In this position of the control element 3, 6 the position memory 1, 2 can be entrained along the rail longitudinal guide for adjusting a new memory position.

The control element 3, 6 is illustrated in FIG. 34 in an isometric view when depositing the position memory 1, 2. By pivoting the rocker 6 clockwise about the bearing shaft 9 in respect to the alignment of the rocker 6 in the entrainment position of the position memory 1, 2 illustrated in the FIG. 7 the control cam 60 of the rocker 6 slides along the control curve 33 of the control lever 3 and lifts the control lever 3 translational along the bearing shaft 9 so that the bearing shaft 9 comes to an abutment at the lower end of the elongated hole 34 of the control lever 3. In this position the control lever 3 is lifted in respect to the control face 22 of the locking element of the position memory 1, 2 so that the locking area 26, 27 of the locking element 2 engages by the action of the helical spring 21 being effective between the slider 1 and the locking element 2 into the lower rail hole pattern 160 of the lower rail 16 for anchoring the position memory 1, 2.

By guiding the control lever 3 in an elongated hole 34 along the bearing shaft 9 and controlling the control lever 3 by the means of the control cam 60 of the rocker 6 along the control curve 33 a translational movement of the control lever 3 is obtained, which only requires a small recess in the upper rail 15 of the rail longitudinal guide 15, 16. The rocker 6 is preferably made as a punched part and is pulled back by the means of the torsion spring 90 shown in FIG. 2.

The cable guide of the actuating Bowden cable 81 for pivoting the rocker 6 about the bearing shaft 9 occurs via a pulley 7 being mounted to the bearing shaft 9 and connected to the rocker 6 and being illustrated in the FIGS. 35 to 37 in an isometric view, a side view and a top view or front view, wherein said pulley adapts the entry aid and memory device to different hinge fittings or motor vehicle seats in the type of an adapter.

The pulley 7 comprises a bearing bore 72, which is mounted to the bearing shaft 9. A support face 72 being eccentric to the bearing bore 72 comprises a cable groove 70, into which the cable core 811 of the actuating Bowden cable 81 can be deposited, the end thereof provided with a cable nipple serves in a nipple receiver 73 for connecting the cable core 811 of the actuating Bowden cable 81 serving as flexible pulling means. In addition the pulley 7 comprises a control face 76 for a remote unlocking or a direct unlocking lever.

Two clips 74, 75 arranged on a side face of the pulley 7 serve the mounting of the pulley 7 to the control element 3, 6, wherein said clips can be clipped onto the arc shaped bar 64 of the rocker 6 and thus allow for a simple mountable connection of the pulley 7 to the control element 3, 6.

The eccentric design of the Bowden cable support in the cable groove 70 of the support face 71 of the pulley 7 changes the support point of the cable or the cable core 811 of the actuating Bowden cable 81 to the centre point, that means to the bearing shaft 9, to which the pulley 7 is mounted with the bearing bore 72. Through this the unlocking force and the Bowden cable path for the entry aid can be changed and optimized by securing at the beginning of the actuation a large pivot angle and thus a fast actuating of the system, while after unlocking the locking device 5 for the seat longitudinal adjustment 15, 16 by the formation of a corresponding contour of the control face 71 of the pulley 7 the rocker 6 is only minimal rotated until the backrest 13 latches.

This occurs in contrast to an even unlocking by the means of a circular pulley, in which the locking area of the position memory 1, 2 is pushed out of the lower rail and completely compresses the spring preloading the locking area to an engagement into the lower rail hole pattern and plastically deforms it, the locking device 5 is rather actuated during an eccentric release and the system is not pivoted in a maximal manner.

In contrast the eccentric design of the Bowden cable support of the pulley 7 changes the support point of the cable 811 of the actuating Bowden cable 81 to the bearing shaft 9 so that the unlocking force and the Bowden cable path of the actuating Bowden cable 81 are changeable in that at the beginning of the actuation a large pivoting and thus a fast actuating of the control element 3, 6 occurs, while after the unlocking the locking device 5 the pulley 7 and thus the rocker 6 rotate only minimal until the backrest 13 is latched. Through this it is secure that at first the position memory 1, 2 latches in the lower rail 16, before the longitudinal adjustment is released by unlocking the locking device 5 so that the storage of the memory position is secured before moving the motor vehicle seat.

For explanation of the motion sequence of the components of the entry aid and memory device in conjunction with the control element 3, 6, the comfort lever 4 and the pulley 7 it is pointed to the previous description of the FIGS. 14 to 18.

The invention claimed is:

1. A motor vehicle seat comprising:
   a seat sub-frame adjustable along a rail longitudinal guide to which a backrest is pivotably hinged and is foldable in a direction towards a seating surface of the seat sub-frame,
   a locking device for arresting the rail longitudinal guide in an adjustable seating longitudinal position,
   an entry aid via which the locking device is releasable when the backrest is folded towards the seating surface, and
   a memory arrangement for adjusting and retrieving a memory position with a position memory that has an adjuster for adjusting the memory position in the rail longitudinal direction of the rail longitudinal guide and a locking element that is pivotably connected to the adjuster, wherein said locking element can be pivoted in a locking rail for locking the adjusted memory position under the effect of a control element and can be pivoted out of the locking rail for adjusting a memory position, wherein the locking element is connected to the adjuster via a slotted guide such that a virtual point of rotation of the locking element lies underneath a rail profile of the locking rail, and
   wherein the slotted guide comprises at least two slotted guide sections, wherein the virtual point of rotation of the locking element is determined by an intersection of normals of the at least two slotted guide sections.

2. The motor vehicle seat according to claim 1, wherein:
   an engagement area is provided on the bottom side of the locking element, wherein said engagement area engages with at least one locking position of the locking rail for adjusting a memory position,
   a control surface extends on an upper side of the locking element, wherein via said control surface the locking element interacts with the control element such that the locking element engages either with its engagement area into the locking position of the locking rail and locks the memory arrangement in a certain seating longitudinal position or is lifted for displacement of the memory arrangement for a new adjustment of a memory position in a rail longitudinal direction out of the locking rail,
   the locking element is supported via an elastic element by the adjuster and is preloaded in a direction to the locked state, and
   the locking element comprises, at at least one side surface, path curves of the slotted guide interacting with the guide elements of the adjuster.

3. The motor vehicle seat according to claim 1, wherein the engagement area of the locking element is adapted to a contour of the locking positions of the locking rail, wherein the engagement area of the locking element is provided with radii, which are adapted to the radii of a lower rail hole pattern of the locking rail such that the engagement area of the locking element uses the full hole width of the locking rail for abutment.

4. A motor vehicle seat comprising:
   a seat sub-frame adjustable along a rail longitudinal guide to which a backrest is pivotably hinged and is foldable in a direction towards a seating surface of the seat sub-frame,
   a locking device for arresting the rail longitudinal guide in an adjustable seating longitudinal position,
   an entry aid via which the locking device is releasable when the backrest is folded towards the seating surface, and
   a memory arrangement for adjusting and retrieving a memory position with a position memory that has an adjuster for adjusting the memory position in the rail longitudinal direction of the rail longitudinal guide and a locking element that is pivotably connected to the adjuster, wherein said locking element can be pivoted in a locking rail for locking the adjusted memory position under the effect of a control element and can be pivoted out of the locking rail for adjusting a memory position,
   wherein the locking element is connected to the adjuster via a slotted guide such that a virtual point of rotation of the locking element lies underneath a rail profile of the locking rail;
   wherein the slotted guide comprises at least two path curves arranged in the locking element and the guiding elements of the adjuster assigned to the at least two path curves; and
   wherein the guiding elements of the adjuster comprise guide bolts which engage into the at least two path curves of the locking element, and further comprising latch noses at ends of respective guide bolts.

5. The motor vehicle seat according to claim 4, wherein the guiding elements of the adjuster comprise a guide contour in the adjuster.

* * * * *